United States Patent
Singh et al.

(10) Patent No.: US 11,513,670 B2
(45) Date of Patent: Nov. 29, 2022

(54) LEARNING USER INTERFACE CONTROLS VIA INCREMENTAL DATA SYNTHESIS

(71) Applicant: Automation Anywhere, Inc., San Jose, CA (US)

(72) Inventors: Sudhir Kumar Singh, Dublin, CA (US); Jesse Truscott, Petaluma, CA (US); Virinchipuram J Anand, San Ramon, CA (US)

(73) Assignee: Automation Anywhere, Inc., San Jose, CA (US)

( * ) Notice: Subject to any disclaimer, the term of this patent is extended or adjusted under 35 U.S.C. 154(b) by 0 days.

(21) Appl. No.: 16/859,488

(22) Filed: Apr. 27, 2020

(65) Prior Publication Data
US 2021/0333983 A1    Oct. 28, 2021

(51) Int. Cl.
| | |
|---|---|
| *G06F 3/04845* | (2022.01) |
| *G06F 3/0482* | (2013.01) |
| *G06F 17/18* | (2006.01) |
| *G06N 20/00* | (2019.01) |
| *G06T 11/60* | (2006.01) |

(52) U.S. Cl.
CPC ........ *G06F 3/04845* (2013.01); *G06F 3/0482* (2013.01); *G06F 17/18* (2013.01); *G06N 20/00* (2019.01); *G06T 11/60* (2013.01); *G06T 2210/12* (2013.01)

(58) Field of Classification Search
CPC .... G06F 3/04845; G06F 3/0482; G06F 17/18; G06N 20/00; G06T 11/60; G06T 2210/12
See application file for complete search history.

(56) References Cited

U.S. PATENT DOCUMENTS

| | | | |
|---|---|---|---|
| 6,009,192 A | 12/1999 | Klassen et al. | |
| 8,504,803 B2 | 8/2013 | Shukla | |
| 9,462,042 B2 | 10/2016 | Shukla et al. | |
| 10,025,773 B2 | 7/2018 | Bordawekar et al. | |
| 10,078,743 B1 | 9/2018 | Baldi et al. | |
| 2005/0002566 A1 | 1/2005 | Federico et al. | |
| 2005/0144462 A1 | 6/2005 | LaGarde | |
| 2010/0013848 A1 | 1/2010 | Hekstra et al. | |
| 2011/0173239 A1 | 7/2011 | Imran et al. | |
| 2012/0076415 A1 | 3/2012 | Kahn | |

(Continued)

OTHER PUBLICATIONS

Alex Krizhevsky, Ilya Sutskever, and Geoffrey E Hinton, Imagenet classification with deep convolutional neural networks, Advances in neural information processing systems (2012).

(Continued)

*Primary Examiner* — John T Repsher, III

(57) ABSTRACT

A User Interface (UI) interface object detection system employs an initial dataset comprising a set of images, that may include synthesized images, to train a Machine Learning (ML) engine to generate an initial trained model. A data point generator is employed to generate an updated synthesized image set which is used to further train the ML engine. The data point generator may employ images generated by an application program as a reference by which to generate the updated synthesized image set. The images generated by the application program may be tagged in advance. Alternatively, or in addition, the images generated by the application program may be captured dynamically by a user using the application program.

15 Claims, 39 Drawing Sheets

(56) References Cited

U.S. PATENT DOCUMENTS

| | | | |
|---|---|---|---|
| 2012/0154633 A1 | 6/2012 | Rodriguez | |
| 2014/0075371 A1* | 3/2014 | Carmi | G06F 9/451 |
| | | | 715/781 |
| 2015/0363224 A1 | 12/2015 | Marcos et al. | |
| 2016/0019049 A1 | 1/2016 | Kakhandiki et al. | |
| 2016/0063269 A1* | 3/2016 | Liden | G06F 21/6254 |
| | | | 726/26 |
| 2016/0078368 A1 | 3/2016 | Kakhandiki et al. | |
| 2016/0119285 A1 | 4/2016 | Kakhandiki et al. | |
| 2017/0060108 A1 | 3/2017 | Kakhandiki et al. | |
| 2017/0154230 A1 | 6/2017 | Dow et al. | |
| 2017/0213130 A1 | 7/2017 | Khatri et al. | |
| 2017/0330076 A1 | 11/2017 | Valpola | |
| 2018/0004823 A1 | 1/2018 | Kakhandiki et al. | |
| 2018/0157386 A1 | 6/2018 | Su | |
| 2018/0173698 A1 | 6/2018 | Dubey et al. | |
| 2018/0349730 A1* | 12/2018 | Dixon | G06K 9/6262 |
| 2019/0250891 A1* | 8/2019 | Kumar | G06F 8/34 |
| 2020/0159647 A1* | 5/2020 | Puszkiewicz | G06K 9/6256 |

OTHER PUBLICATIONS

Andrew G Howard, Menglong Zhu, Bo Chen, Dmitry Kalenichenko, Weijun Wang, Tobias Weyand, Marco Andreetto, and Hartwig Adam, Mobilenets: Efficient convolutional neural networks for mobile vision applications, arXiv:1704.04861v1 (2017).

Chollet, Francois et al., Keras: The Python Deep Learning Library, GitHub, https://github/keras-team/keras, 2015.

Christian Szegedy, Wei Liu, Yangqing Jia, Pierre Sermanet, Scott Reed, Dragomir Anguelov, Dumitru Erhan, Vincent Vanhoucke, and Andrew Rabinovich, Going deeper with convolutions, Proceedings of the IEEE conference on computer vision and pattern recognition, pp. 1-9 (2015).

J. Canny, A computational approach to edge detection, IEEE Transactions on Pattern Analysis and Machine Intelligence, PAMI-8(6):679-698, Nov. 1986.

Jifeng Dai, Yi Li, Kaiming He, and Jian Sun, R-fcn: Object detection via region-based fully convolutional networks, Advances in neural information processing systems, 2016.

Joseph Redmon, Santosh Divvala, Ross Girshick, and Ali Farhadi, You only look once: Unified, real-time object detection, Proceedings of the IEEE conference on computer vision and pattern recognition, pp. 779-788, 2016.

Kaiming He, Xiangyu Zhang, Shaoqing Ren, and Jian Sun, Deep residual learning for image recognition, Proceedings of the IEEE conference on computer vision and pattern recognition (2016).

Koen EA Van De Sande, Jasper RR Uijlings, Theo Gevers, and Arnold WM Smeulders, Segmentation as Selective search for Object Recognition, International journal of computer vision, 104(2) (2013).

M. A. Hearst, S. T. Dumais, E. Osuna, J. Platt, and B. Scholkopf, Support vector machines, IEEE Intelligent Systems and their Applications, 13(4):18-28, Jul. 1998.

Navneet Dalal and Bill Triggs, Histograms of oriented gradients for human detection, International Conference on computer vision & Pattern Recognition (CVPR'05), vol. 1, pp. 886-893. IEEE Computer Society, 2005.

Ross Girshick, Fast r-cnn, Proceedings of the IEEE international conference on computer vision (2015).

Ross Girshick, Jeff Donahue, Trevor Darrell, and Jitendra Malik, Rich feature hierarchies for accurate object detection and semantic segmentation, Proceedings of the IEEE conference on computer vision and pattern recognition (2014).

Shaoqing Ren, Kaiming He, Ross Girshick, and Jian Sun, Faster r-cnn: Towards real-time object detection with region proposal networks, Advances in neural information processing systems, 2015.

Tsung-Yi Lin, Michael Maire, Serge Belongie, James Hays, Pietro Perona, Deva Ramanan, Piotr Dollár, and C Lawrence Zitnick, Microsoft coco: Common objects in context, European conference on computer vision (2014).

Tsung-Yi Lin, Priya Goyal, Ross Girshick, Kaiming He, and Piotr Dollár, Focal loss for dense object detection, Proceedings of the IEEE international conference on computer vision (2017).

Wei Liu, Dragomir Anguelov, Dumitru Erhan, Christian Szegedy, Scott Reed, Cheng-Yang Fu, and Alexander C Berg, Ssd: Single shot multibox detector, European conference on computer vision, pp. 21-37. Springer, 2016.

International Search Report and Written Opinion for PCT/US2020/030496, dated May 26, 2021.

\* cited by examiner

LEARNING USER INTERFACE CONTROLS VIA INCREMENTAL DATA SYNTHESIS

FIELD OF THE DISCLOSURE

This disclosure relates generally to the field of data processing systems and more particularly to detection of objects in images.

BACKGROUND

Detecting User Interface (UI) control objects using screen images or videos of a computer application is a key requirement for automating tasks. This is particularly the case with applications which reside behind firewalls and in virtual or remote desktop environments. In particular, as the demand for automation increases, it is imperative to recognize controls in legacy application programs which do not provide programmatic access, in order to automate usage of such applications. For websites, the code is available in one form or another so detection of controls and their type on the website is relatively straightforward. However, many licensed applications do not allow permit access to their code. Moreover, in certain situations, applications may be used by an automation user by way of remote desktop type software where only the screen image is available to the user. Automated detection of controls on such applications for automation is a challenge.

Building models to learn and detect such UI control objects from application screen images effectively requires a large number of images for training and testing of the models. However, obtaining sufficiently large number of such images in realistic business application scenarios is hard as businesses that use these applications are usually averse to sharing such images due to potentially sensitive information that these applications might contain about the business and its customers.

SUMMARY

Computerized methods and systems to detect user interface application controls are disclosed herein. In one embodiment, a computer-implemented method detects one or more user interface control objects contained in a screen image of a user interface generated by an application program. An initial dataset that comprises a plurality of images is accessed, where each of the images represents a screen of information containing one or more user interface control objects, where each user interface control object is part of a corresponding user interface control object class. A machine learning model is trained with a portion of the initial dataset, which is designated as a training portion of the initial dataset, to cause the machine learning model to detect user interface control objects in each of the plurality of object classes. The initial dataset is then modified by accessing screen images generated by at least a first application program and processing the screen images generated by the first application program to detect user interface control objects in the screen images generated by the first application program. A set of new application screen images is created as a function of the user interface control objects detected in the screen images generated by the first application program. An updated dataset is generated by modifying the initial dataset with the set of new application screen images. The machine learning model is further trained with the updated dataset to generate a retrained machine learning model.

Modification of the initial dataset may be performed by a data point generator which is employed to generate an updated synthesized image set. The data point generator may employ images generated by an application program as a reference by which to generate the updated synthesized image set. The images generated by the application program may be tagged in advance. Alternatively, or in addition, the images generated by the application program may be captured dynamically by a user using the application program, where in one embodiment, sensitive information is removed from the application program.

These and additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

Figure 16:
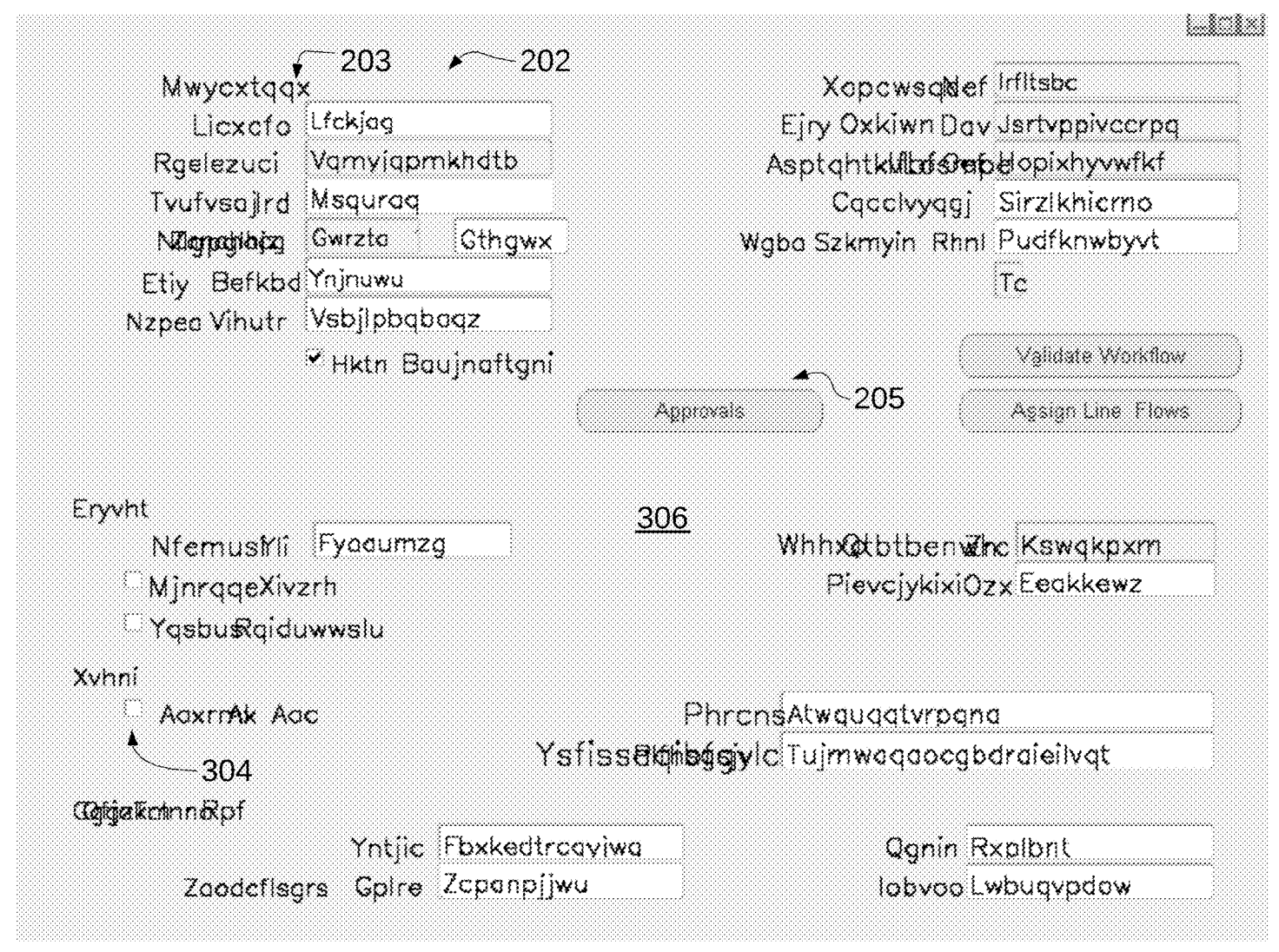

FIGS. 15 and 16 are screenshots showing examples of synthesized images based on the application screen image shown in FIG. 2A.

Figure 17:
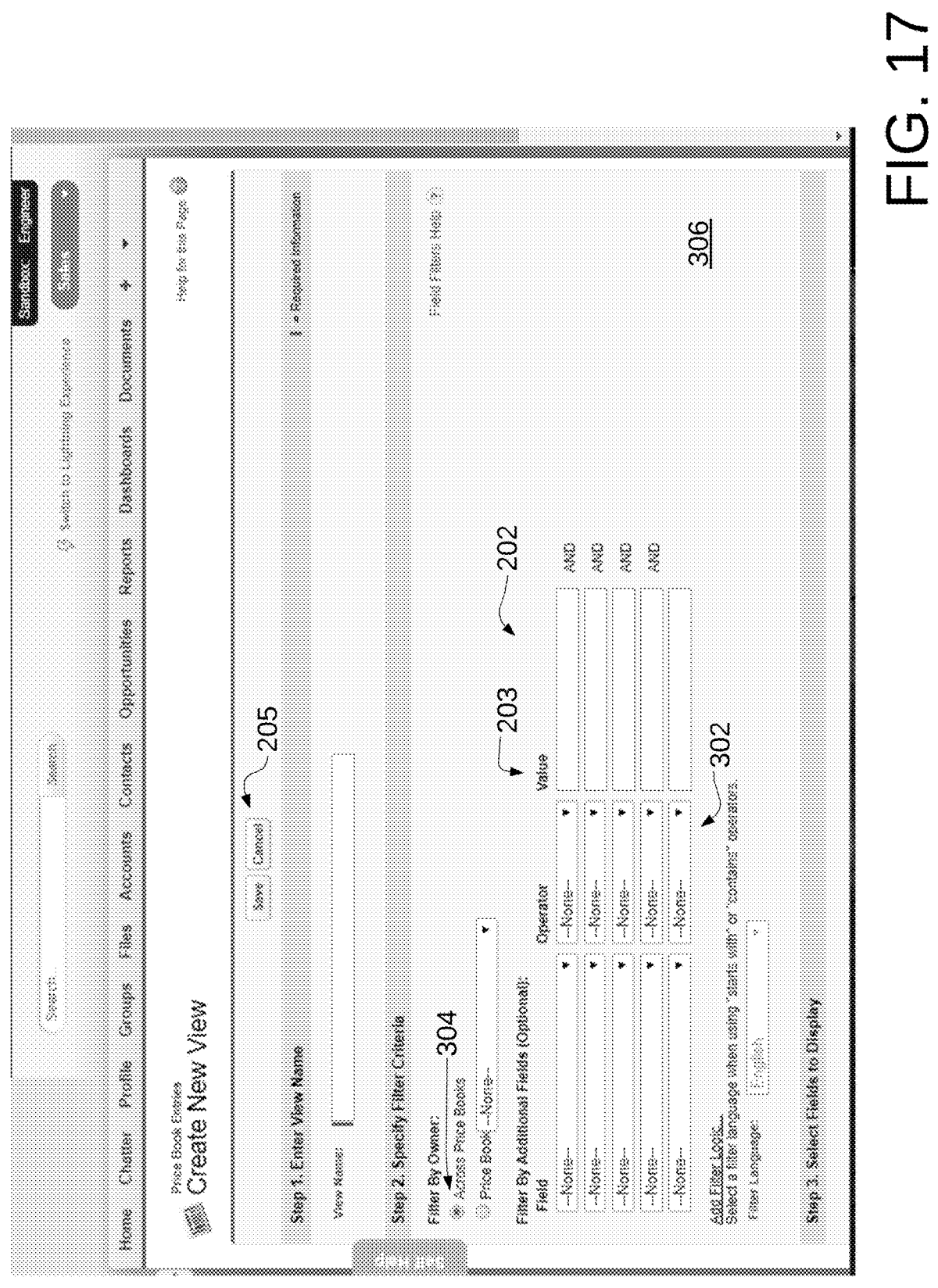

FIGS. 17, 18, 19 and 20 are screenshots showing additional examples of original application screen images.

FIGS. 30, 31, 32 and 33 are screenshots showing a first example of synthesized images.

DETAILED DESCRIPTION

Figure 1:
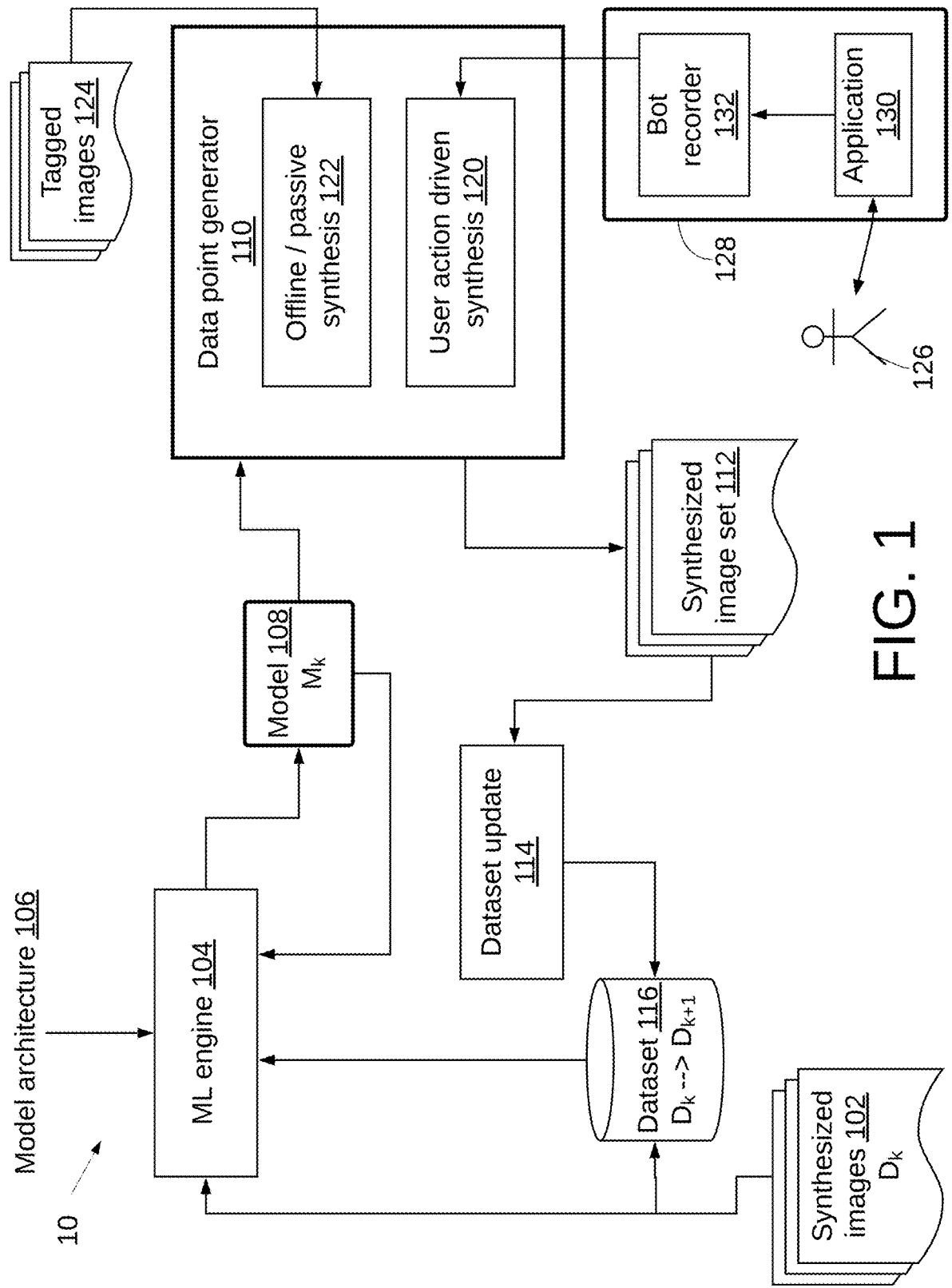
FIG. 1 is a high-level block diagram illustrating an embodiment of a UI interface object detection system.

In the following detailed description, reference will be made to the accompanying drawings, in which identical functional elements are designated with like numerals. Elements designated with reference numbers ending in a suffix such as 0.1, 0.2, 0.3 are referred to collectively by employing the main reference number without the suffix. For example, 100 refers to topics 100.1, 100.2, 100.3 generally and collectively. The aforementioned accompanying drawings show by way of illustration, and not by way of limitation, specific embodiments and implementations consistent with principles of the present invention. The screenshots shown in certain of the drawings are greyscale conversions from screenshots originally generated in color. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Any computer application consists of User Interface (UI) control objects that the user interacts with to complete one or more tasks. These controls take for example, mouse clicks or keyboard inputs or combinations thereof from the user to perform one or more actions intended to complete the intended task. Therefore, any system that understands and automates such tasks, such as a Robotic Process Automation (RPA) system, utilizes understanding of such UI controls. Further, understanding and automating processes, which comprise a sequence of tasks, may involve one or more tasks from one or more applications. Therefore, a system and method that detects UI controls across several applications is desirable. Such systems and methods that are robust and fast allow for accurate task and process automation that is very significant from a business value perspective.

The task of UI control detection becomes even more challenging when the corresponding applications reside in virtual and remote desktop environments and/or behind firewalls. In such cases, the user's computer has no direct access to the application but only an image or video screenshots that the user can interact with using a keyboard and mouse. In such scenarios, any method to detect UI controls use the image or video as input. Usage of systems employing such virtual and remote desktop environments continues to be highly desirable given increasingly high standard safety and privacy requirements and regulations. Further, information technology departments prefer installing applications that require high complexity computing environment in virtualized computers so that they don't have to teach or support each of their employees individually for installing and maintaining these applications on their computers.

Even though an application may look the same and interact in the same way across different computing environments, the internal functionalities of how it implements those interactions may vary quite a bit across computers, depending on what underlying application framework, operating system and hardware those particular computers have. For example, a web page may look almost same to the user and would work the same way whether a user views it in Firefox® browser, Internet Explorer® browser or Chrome® browser, but the internal workings of these browsers and how they interact with operating system are very different from each other. Similarly, a Java®-based Oracle application would look the same on two computers, such as one with Windows® OS and the other with Mac® OS but their underlying JVMs (Java Virtual Machines) are very different. Further, the speed of the application will be governed by the underlying hardware of those computers. A UI control detection method that is agnostic to application framework and computing environments is therefore desirable. An image or video-based method is accordingly desirable in this case and in particular one that uses only the visual aspects of the UI and not the internal working of the UI. Such a technique would thereby be inherently agnostic to application frameworks and computing environments.

UI control object detection is used in the understanding and automation of business tasks and processes which often involve sensitive information about the business itself and their clients. For example, consider a bank that wants to automate the task of validating information in a user's loan application. Such loan applications contain information such as social security numbers of the applicants, their addresses, employers and other personal information. The divulsion of such information may lead to severe misuse or identity theft. Consequently, the bank prefers not to share such an information with any vendor and ideally would prefer humans to not see such information at all. On the other hand, machine learning systems to build accurate and robust UI control object detection models need datasets that represent real world distribution of such UI control objects in such realistic applications.

Application User Interfaces (UIs) are usually built from a finite set of visual effects, a layout and a style library. So even though realistic applications create their unique footprints and noise there are underlying structures that are shared across the applications. At an object level it means that application UIs follow similar invariance characteristics. As explained in further detail below, an invariance characteristic for an object is a characteristic across which the object might vary (or take different values) yet the object definition does not change. Disclosed herein are embodiments that define and capture the set of such image level and object level invariances across real applications and use them to synthesize datasets that mimic the distributions of these real applications. Certain disclosed embodiments are (i) self-supervised, meaning they do not require extensive human labeling of data, and (ii) privacy aware meaning they respect the privacy constraints imposed by the owner of the applications (e.g. no sharing of sensitive information).

A high-level description of the system 10 shown in FIG. 1 is first provided followed by an explanation of various aspects of operation of the system 10. FIG. 1 shows an embodiment of a UI interface object detection system 10 where a set of synthesized images ($D_k$) 102 is employed to train a machine learning (ML) engine 104. The ML engine 104 may employ any one of a number of model architectures 106. The ML engine 104 employs the synthesized images 102 to generate an initial trained model (Mk) 108. A data point generator 110 is employed to generate an updated synthesized image set 112 which is used to update at 114, the initial dataset $D_k$ of synthesized images 102 to an updated dataset $D_{k+n}$ 116 which may be used to further train the ML engine 104. As explained in further detail herein, the data point generator 110 operates to generate additional data points, such as screen images, from actual screen images by employing the initial trained model 108.

In certain embodiments, the system 10 implements a computer-implemented method for detecting one or more UI control objects contained in a screen image of a UI generated by an application program. An initial dataset is accessed, where the initial dataset has a plurality of synthetically generated images. Each of the synthetically generated images represents a screen of information containing one or more UI control objects, where each UI control object is part of a corresponding UI control object class. A machine learning model is trained with a portion of the initial dataset, that is designated as a training portion of the initial dataset, to cause the machine learning model to detect UI control objects in each of the plurality of object classes. In certain embodiments, the initial dataset is modified by accessing screen images generated by at least a first application program. In such embodiments, the screen images generated by the first application program are processed to detect UI control objects in the screen images generated by the first application program and a set of new application screen images is created as a function of the UI control objects detected in the screen images generated by the first application program. An updated dataset is generated by modifying the initial dataset with the set of new application screen images. The machine learning model is further trained with the updated dataset to generate a retrained machine learning model.

The operation of accessing screen images generated by the first application program may be performed by retrieving a set of tagged screen images where each screen image of the set of tagged screen images has for one or more UI control objects in the screen image, a set of tagged bounding boxes, with each tagged bounding box surrounding a corresponding UI control object, and a tagged object class identifier that classifies the corresponding UI control object into one of a plurality of object classes. The tagging in the embodiments disclosed includes associating one or more identifiers to a UI control object, such as to a bounding box associated with a UI control object and providing an object class identifier that identifies an object class for the UI control object of interest.

The operation of processing the screen images generated by the first application program to detect UI control objects in the screen images generated by the first application program may be performed by processing the set of tagged screen images with the machine learning model, as trained by the initial dataset, to generate for each tagged screen image of the set of tagged screen images, a set of detected bounding boxes, where each of the bounding boxes has associated therewith an object class label that identifies an object class associated with a UI control object within the associated bounding box. A confidence score is also generated for each bounding box where the confidence score is indicative of a level of confidence of identification of the UI control object within the associated bounding box. For each tagged screen image the set of detected bounding boxes is compared to the set of tagged bounding boxes to generate a set of failure cases comprising missed or incorrectly identified bounding boxes. Invariance parameters associated with each UI control object contained in the set of failure cases are collected. A set of updated invariance parameters is generated by updating invariance parameters employed by the machine learning engine as a function of the invariance parameters associated with each UI control object contained in the set of failure cases.

The operation of creating a set of new application screen images as a function of the UI control objects detected in the screen images generated by the first application program may also include generating for each new application screen image of the set of new application screen images, one or more UI control objects as a function of the updated invariance parameters.

The operation of accessing screen images generated by at least a first application program may also include capturing application screen images generated by the first application program as the first application program is used by a user of the first application program. The operation of processing the screen images generated by the first application program to detect UI control objects in the screen images generated by the first application program may also include processing each captured application screen image with the machine learning model, as trained by the dataset, to generate for each captured application screen image, a set of detected bounding boxes where each of the bounding boxes has associated therewith an object class label that identifies an object class associated with a UI control object within the associated bounding box and a confidence score indicative of a level of confidence of identification of the UI control object within the associated bounding box. The UI control objects within the detected bounding boxes may then be presented to the user to permit interaction by the user, with the user inputs being captured.

Figure 2A:
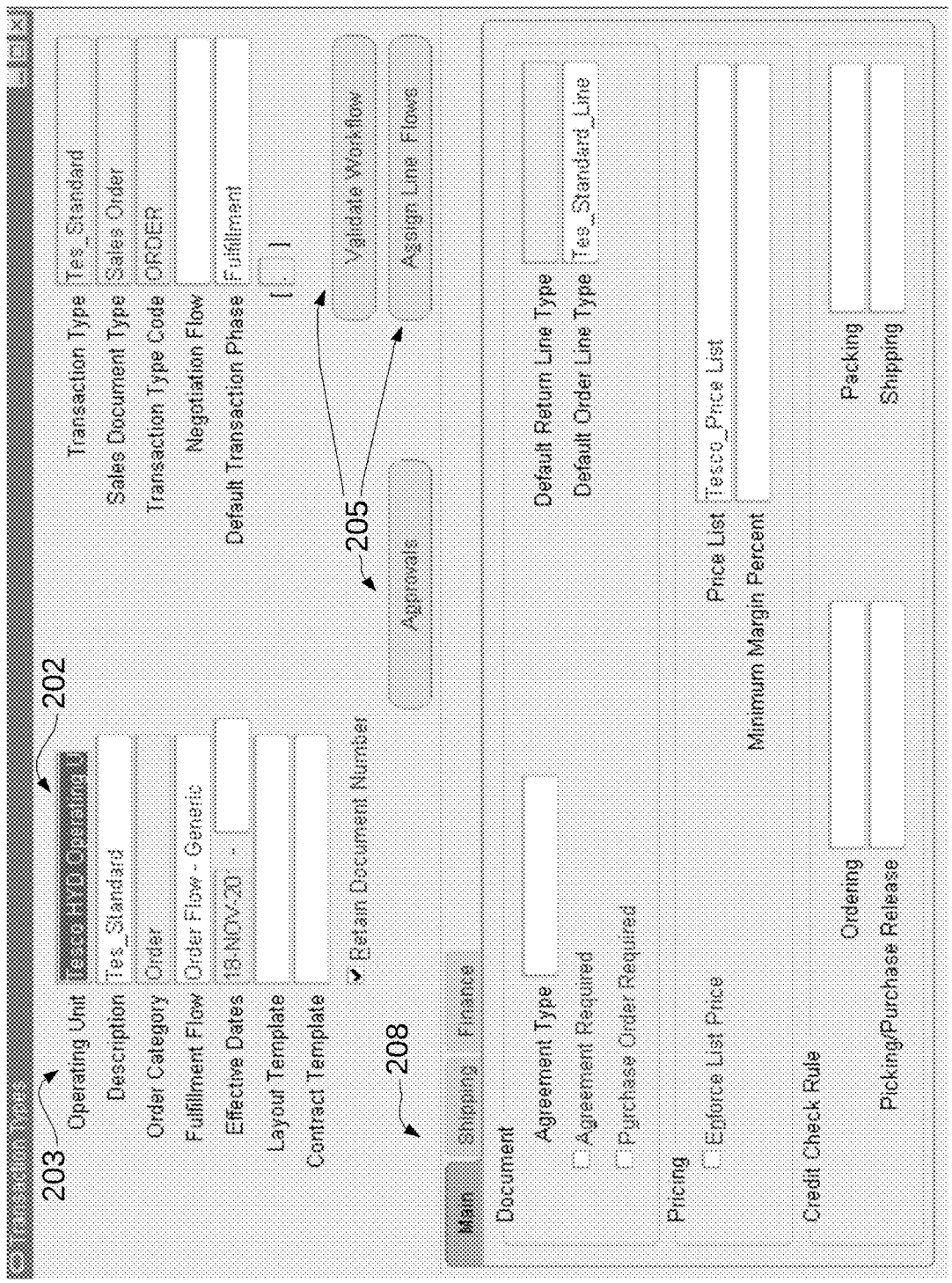
FIG. 2A is a screenshot showing an example of an original application screen image.
Figure 2B:
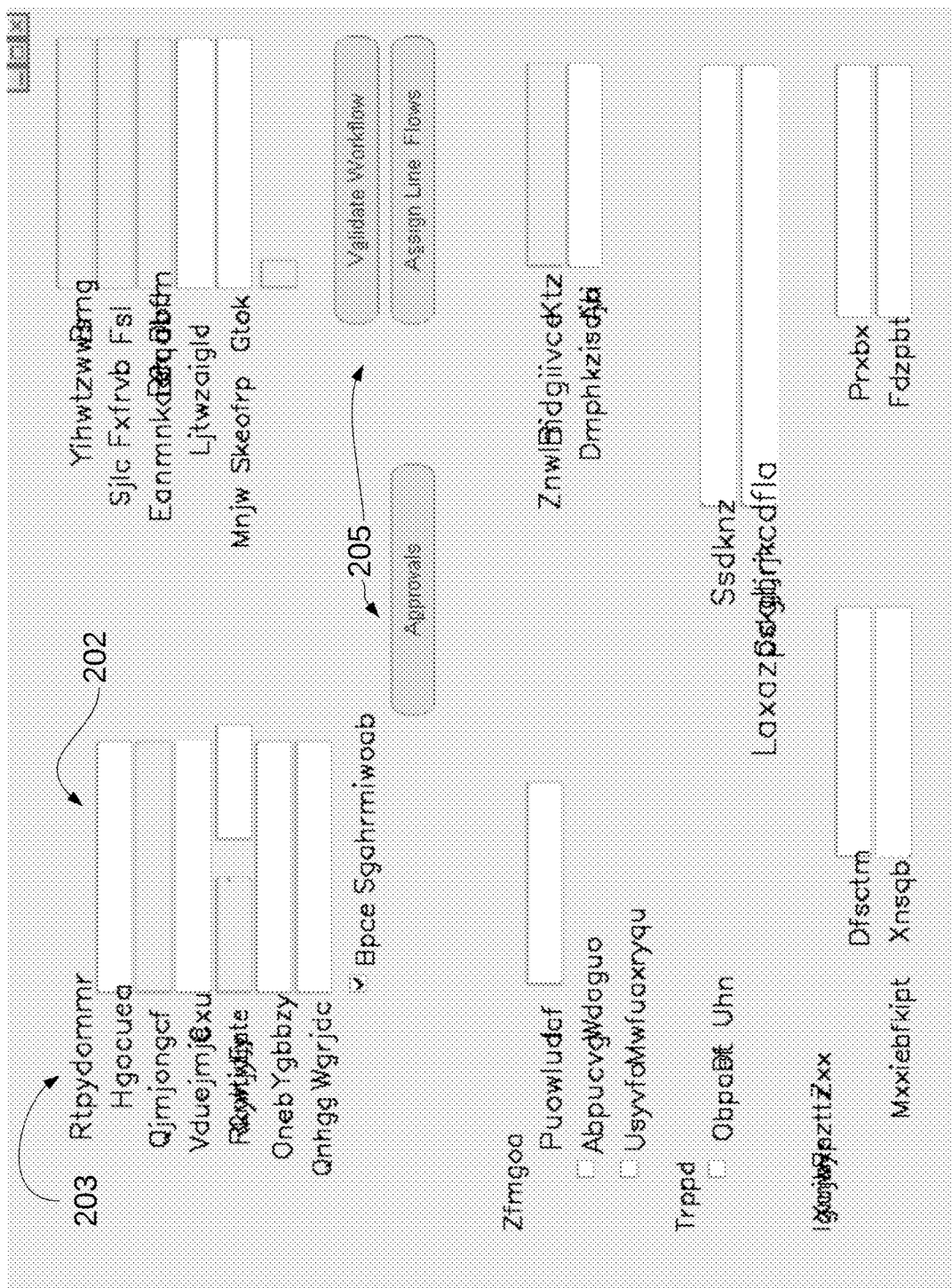
FIG. 2B is a screenshot showing a synthesized image based on the original application screen image of FIG. 2A.
Figure 3:
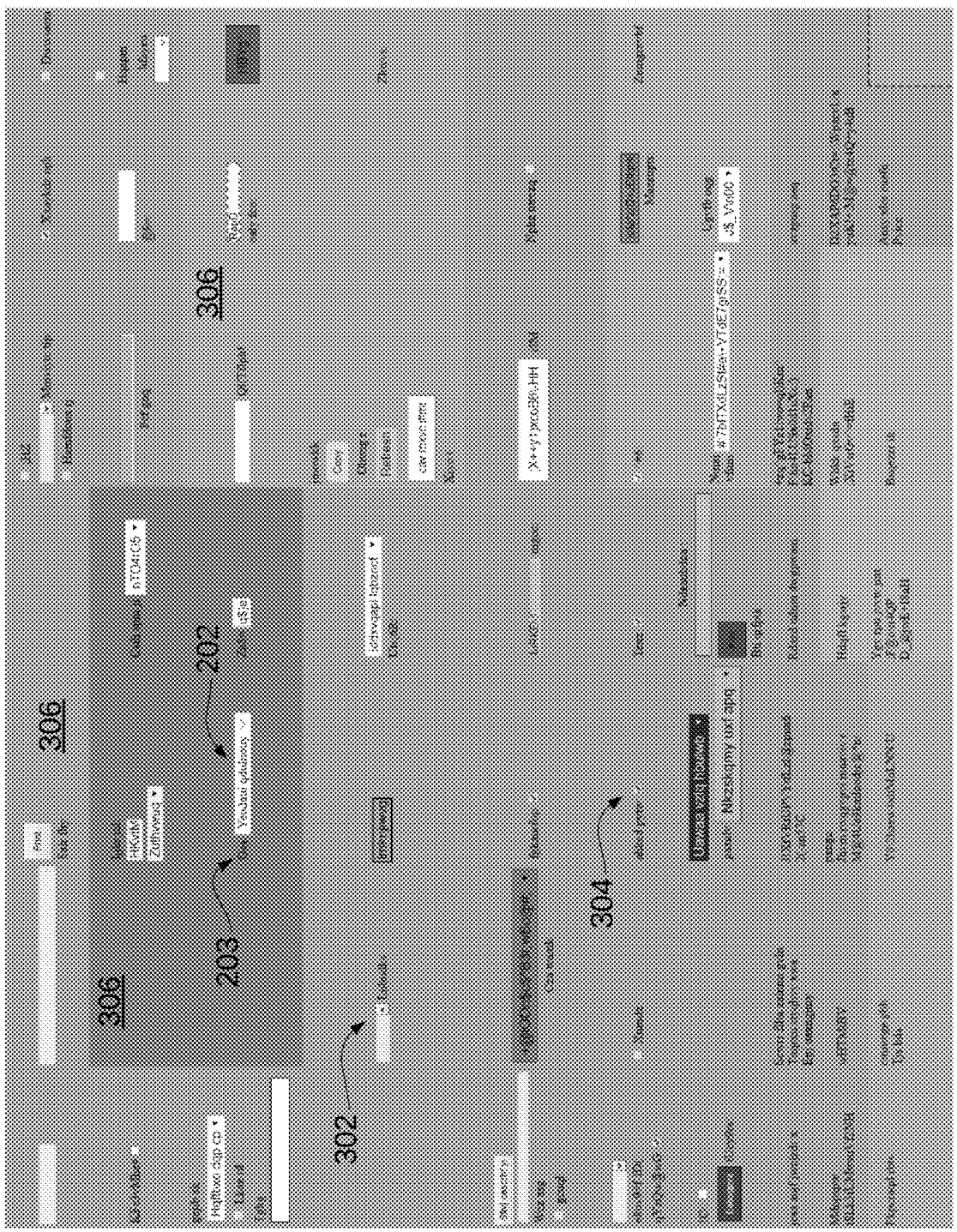
FIGS. 3, 4, 5, 6, 7, 8, 9 and 10 are screenshots of examples of additional synthesized images with various object and image level invariances.
Figure 4:
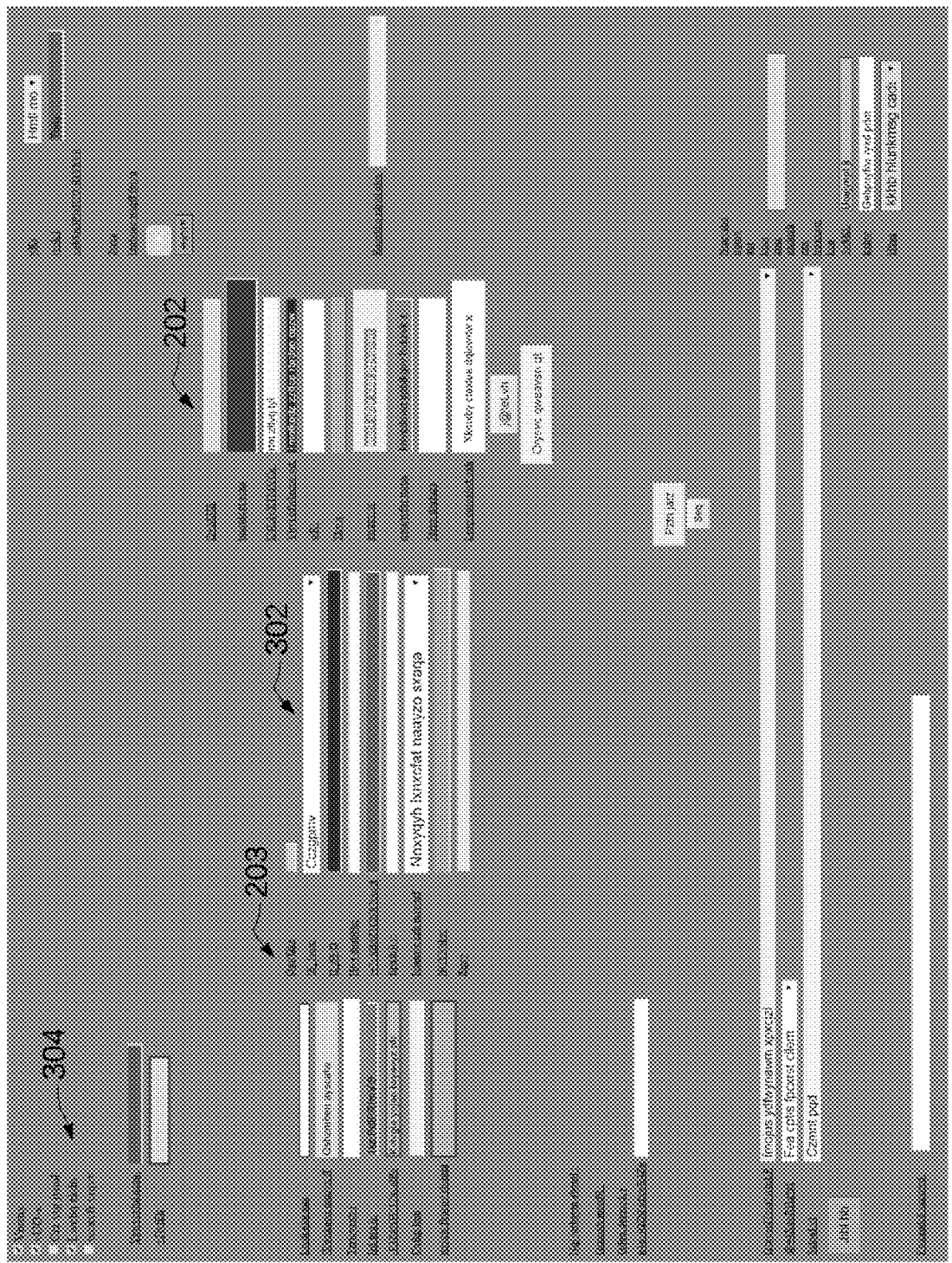

An example of a privacy constraint noted above would be that no textual information entered in a UI control object, such as a "TEXTBOX" and that selected in a "COMBO-BOX" are to be shared or used, but all other info can be shared and used. In such a scenario, disclosed embodiments automatically create a version of the application UI keeping all image level info but erase or replace information inside the "TEXTBOX" and "COMBOBOX". Another example of a privacy constraint would be to replace all text information except those in UI control objects of "BUTTON" class. This is shown in FIGS. 2A and 2B. FIG. 2A shows a screenshot of an original application screen which includes a variety of UI control objects such as text boxes, seen generally at 202, labels, seen generally at 203, buttons, seen generally at 205 and tabs, seen generally at 208. FIG. 2B shows a screenshot of a synthesized image to mimic that of FIG. 2A while respecting privacy constraints which in this instance is to remove or replace all text information except buttons. In the example shown in FIG. 2B, the text in the text fields 202 has been removed by replacing the content of the field with background color of the field and the text for the labels is randomly generated.

Figure 5:
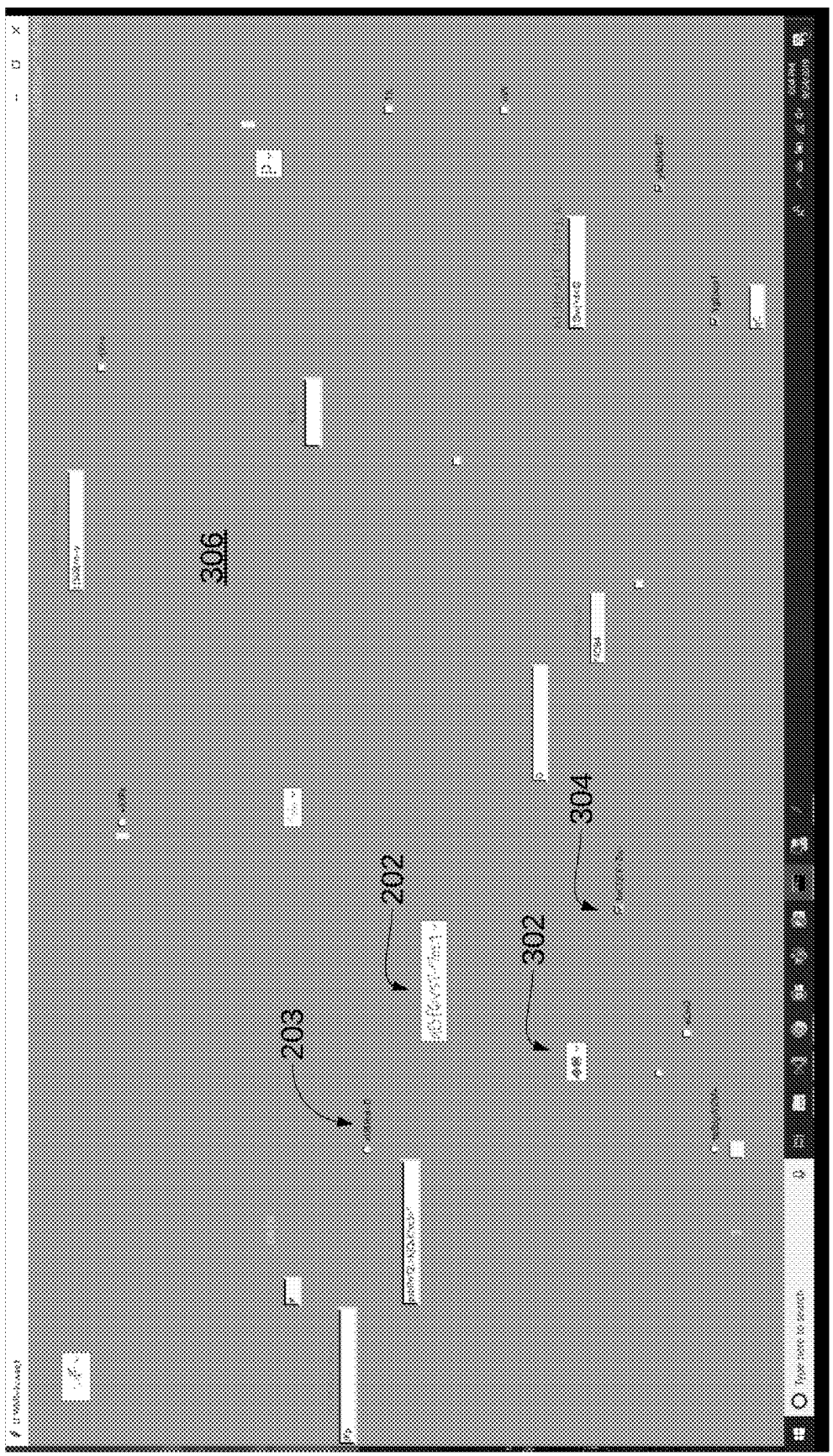
Figure 6:
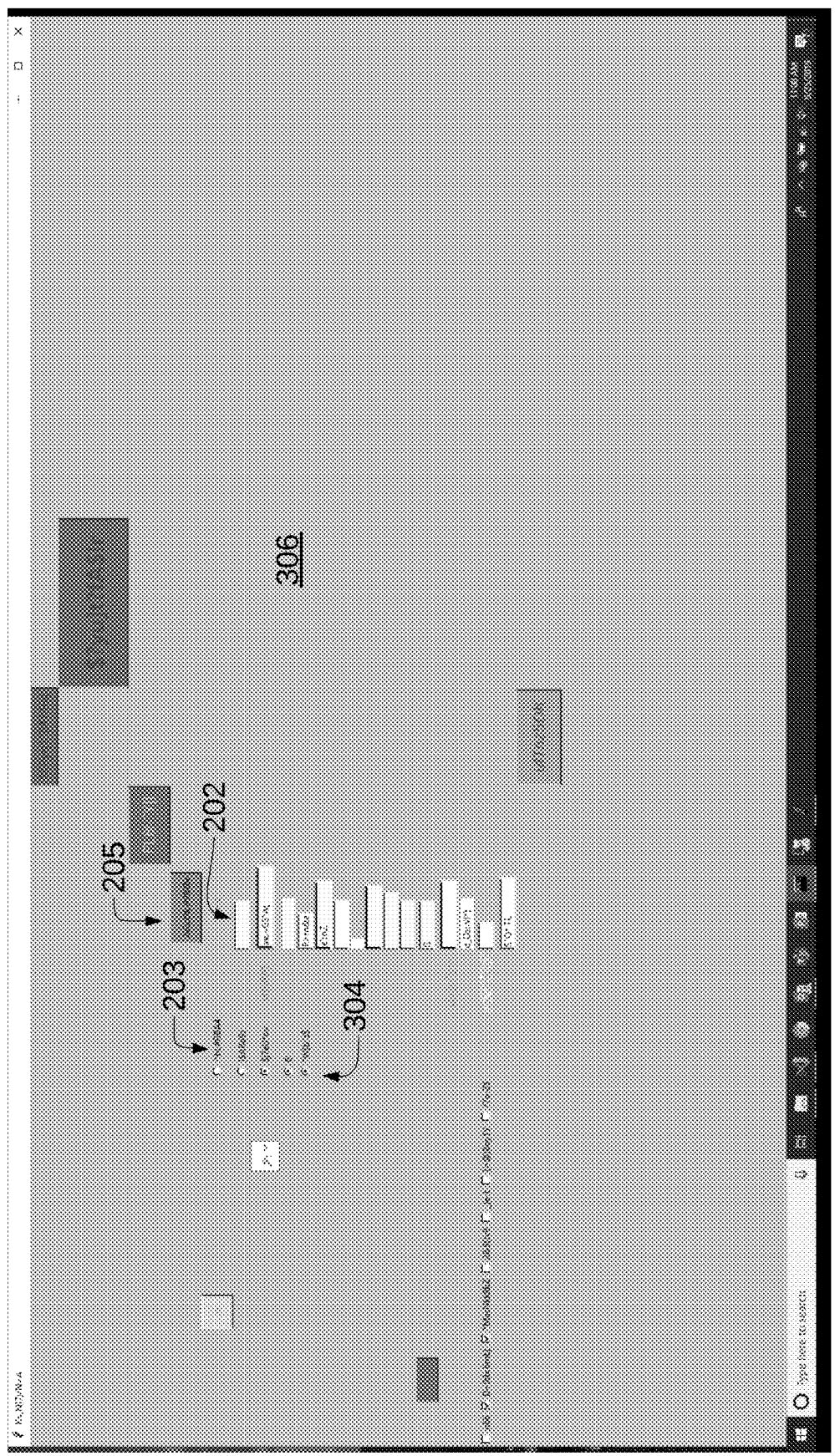
Figure 7:
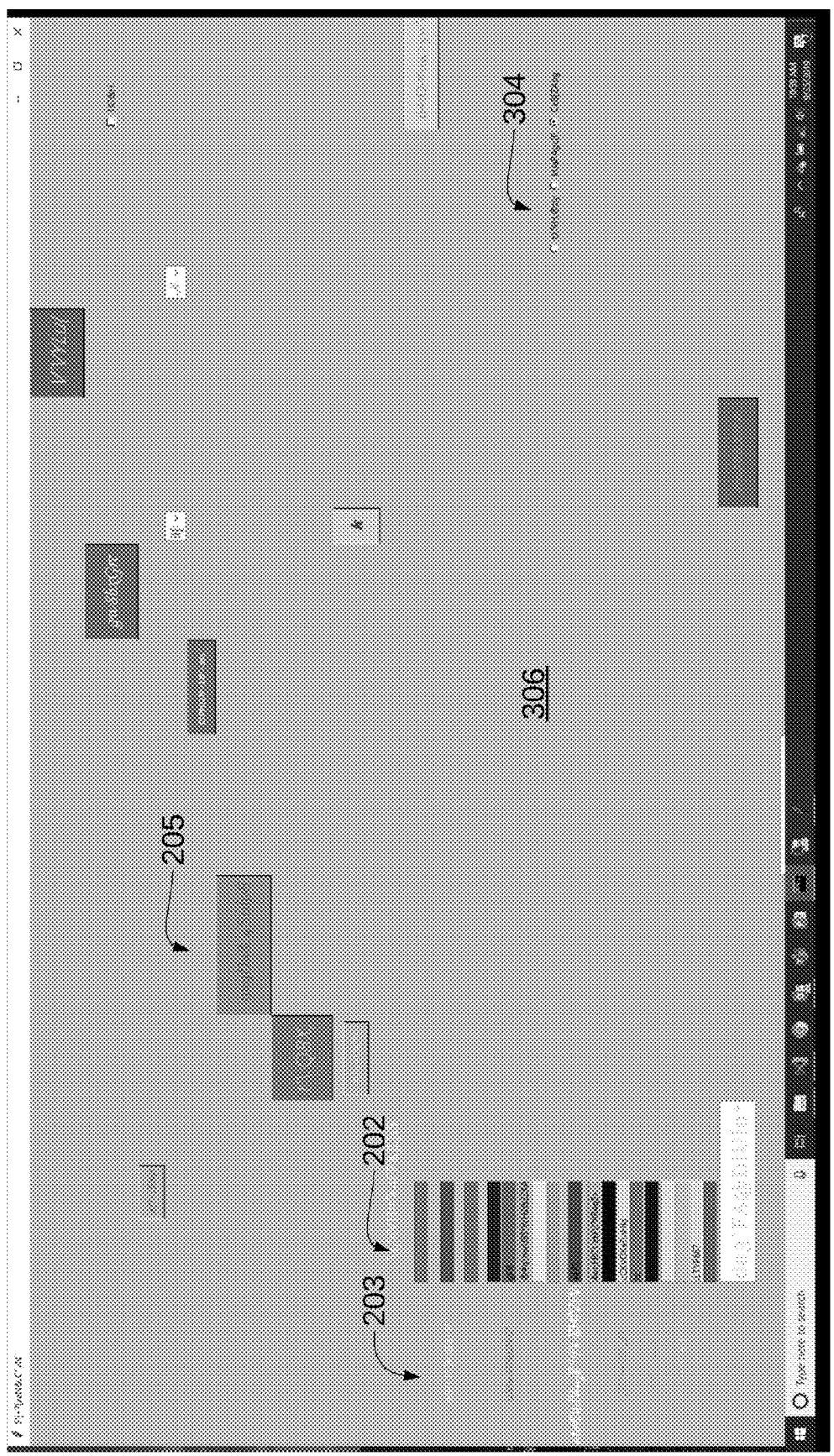
Figure 8:
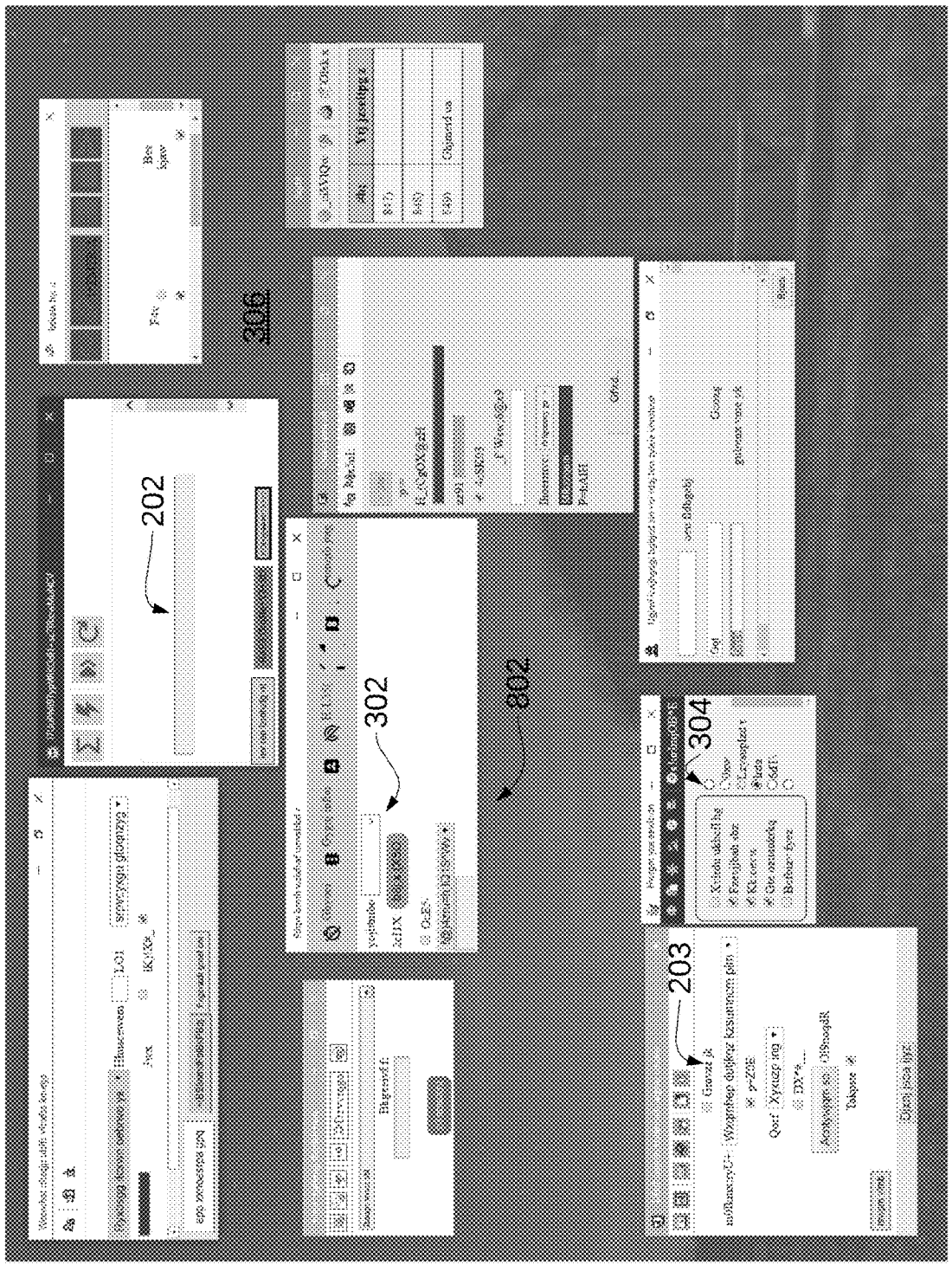
Figure 9:
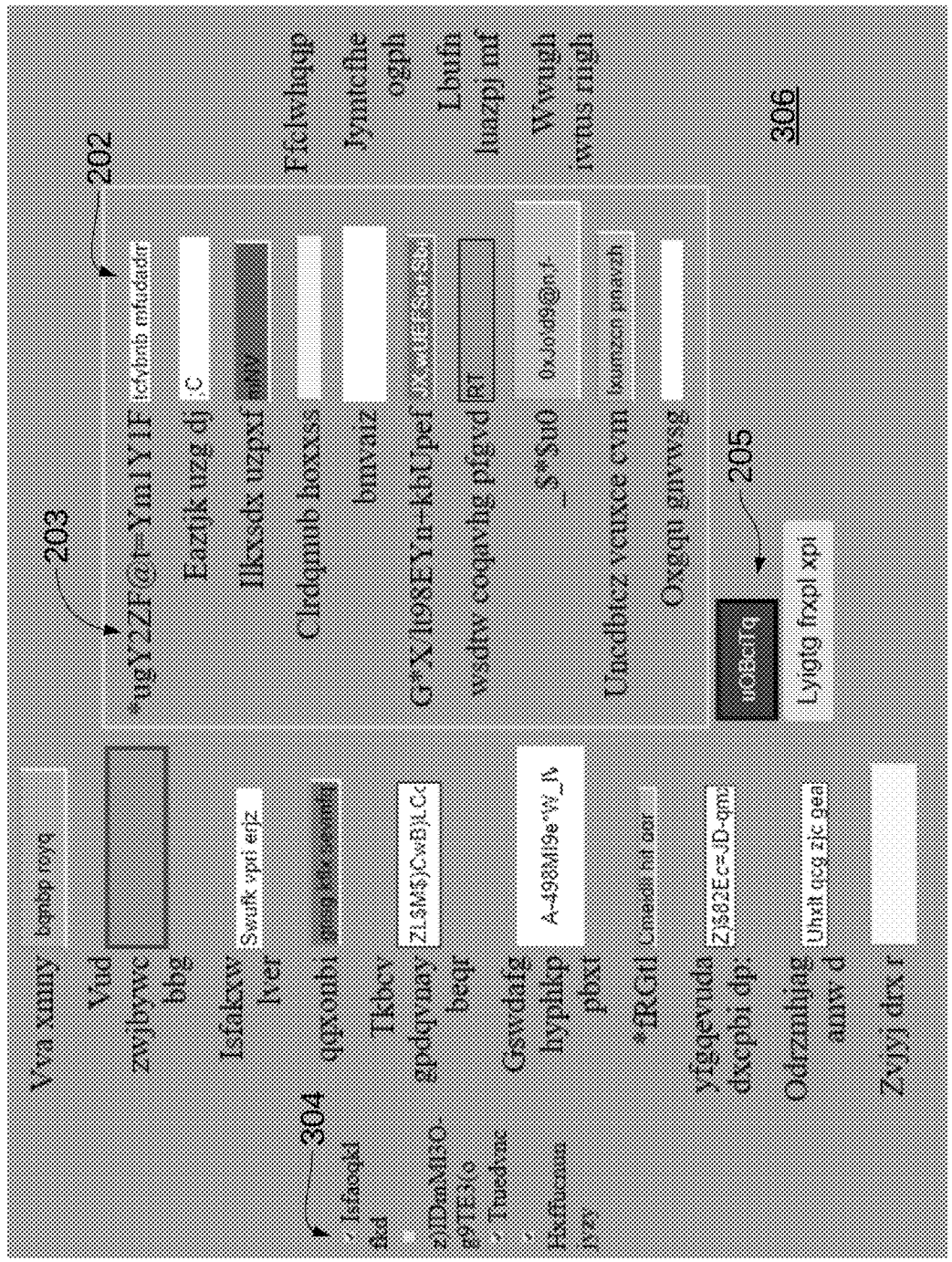
Figure 10:
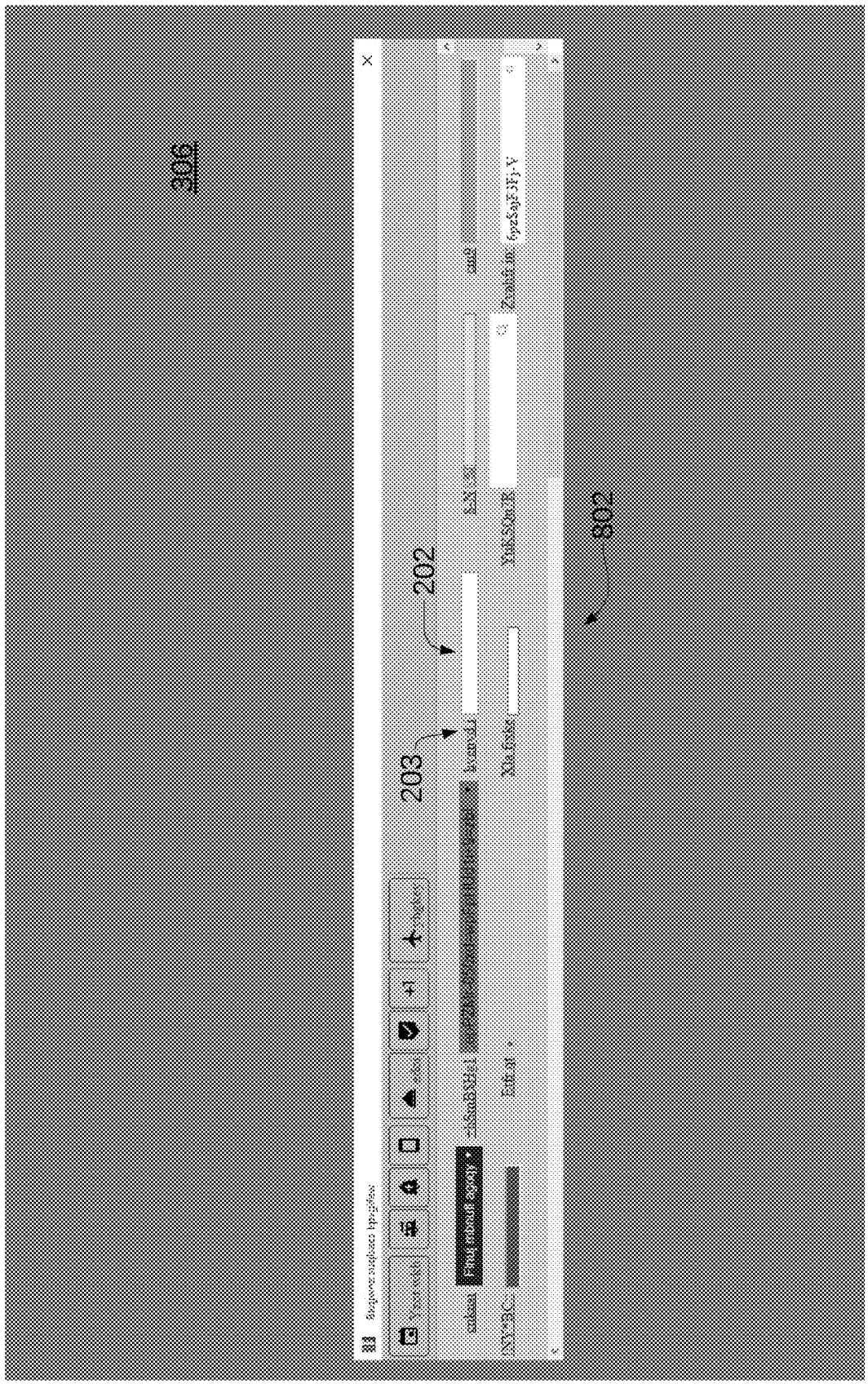

The self-supervised nature of certain embodiments calls for an initial dataset that has not encountered any real-world data yet. The datasets may be characterized using the distributions of the datapoints inside them along with a set of invariance parameters. An invariance parameter for an object is a parameter across which the object might vary (or take different values) yet the object definition does not change. For example, one invariance of a UI control object "TEXTBOX" is width as no matter what the width is "TEXTBOX" is still a "TEXTBOX". Another way to look at an invariance parameter is from the machine learning system or method itself. It is desirable to have a learning system trained to detect such an object and to be invariant to any value the parameter takes. For example, the same detection model should be able to detect all textboxes of all widths. The invariances can include both object level invariances such as height, width, aspect ratio, colors, texts inside controls etc., and image level invariances such as how the controls are arranged in the application, and the resolution, noise etc. Therefore, in one embodiment, based on the properties of the objects a set of object level invariance parameters is created. The initial dataset $D_k$ is synthesized based on these initial set of invariance parameters in a manner in which their values are distributed uniformly in reasonable intervals. For example, for the UI control object "TEXTBOX", the object properties may comprise a rectangular shape with borders and may be filled with certain color and text inside its rectangular region. These properties are captured by invariance parameters width, height, border width and color, type of color inside the box, color, font, size of the text inside the box etc. By values taken uniformly from reasonable intervals, we mean that the values for each of these parameters is picked a random with equal probability from a list of values. For example, width may take a value in an interval of 20 pixels to 1000 pixels as "TEXTBOX" is expected to be laid out on a UI application presented in full HD resolution along with other textboxes. Similarly, a color for inside of the rectangular region of the TEXTBOX may come from a set of 500 colors picked after dividing a color wheel in 500 parts. Border width may range from 1 pixel to 5 pixels etc. Further, this initial dataset $D_k$ is also given image level invariance by putting various kinds of layouts of the objects inside the image and their relative geometric positions. This is shown in FIGS. 3-10 which provide examples of synthesized images with such object and image level invariances. As seen in FIGS. 3-10 a variety of UI control objects are generated for each screen image, such as textboxes 202 and associated labels 203, dropdowns 302 and checkboxes 304. For textboxes 202, which call for information to be entered by a user, some textboxes have random text entered while others are left empty. A variety of background colors 306 are generated (seen converted to greyscale). Some of the UI control objects are set in a regular or ordered pattern, such as in FIGS. 4, 6, 9, 10 while others appear to have a random pattern, such as seen in FIG. 5. While the ordering may appear to be random, the varied ordering facilitates learning by a machine learning engine. Additionally, the UI control objects are of varying dimensions with varying aspect ratios. Additionally, certain screen images, such as seen in FIG. 8 may show multiple UI windows 802 each with their own UI control objects. Further, certain screen images, such as seen in FIG. 10 may have a UI window which consumes only a portion of the screen image.

UI controls are characterized by a finite set of types of controls, such as for example, text boxes, drop-down selection boxes, buttons, tabs, etc. Such controls though can have a wide degree of variation in how they are arranged. Also, noise can occur in captured images, such as when a screen image is displayed on a low-resolution screen. Page layouts can also vary and can be affected by user preferences on display choices (font sizes, colors, etc.). Moreover, the sequence of images provided to a user by an application can vary based on user inputs (for example, a user selection of an option on the screen will often result in a change in the screen image and UI controls displayed). Given that the object properties for the various UI controls are known in advance, invariance parameters for each of the different type of UI controls can be employed to create the initial dataset of images as shown by way of example in FIGS. 3-10. Generation of the initial dataset may be accomplished by way of a software program that generates known layouts along with use of randomness in the selection of UI controls, their invariance parameters and layouts, to achieve translational invariance with a goal to generate an initial dataset of sufficient size to train a machine learning model. By way of example, the initial dataset may be around fifty thousand images, with forty thousand allocated for training and ten thousand allocated for validation. The initial dataset may not have any actual example of an actual application screen, as generated by any given application program, to be detected but will contain the UI control objects sought to be detected, even though actual arrangement of any given image in initial dataset may not match any actual screen to be detected.

Turning back to FIG. 1, once initial dataset $D_k$ is synthesized it is incrementally augmented and updated (to generate $D_{k+n}$) using model training. This is followed by one or more data point generation techniques 110 that employ the trained model 108 to guide the synthesis of new data either actively using user actions performed during an interaction session with an application, shown at 120 and/or using a passive inference process on unseen examples of application UI screenshots, shown at 122.

Training model 108 involves training a model to detect a set of given objects (UI controls for instance) with a dataset 116 where the model 108 is invariant to a set of invariance parameters. A model architecture is selected at 106. In one embodiment, the model architecture consists of a convolutional Deep Neural Network (DNN) comprising a shared network, a classification network and a box regression network that processes the image region wise and outputs a set of detected boxes, the corresponding class label and the corresponding confidence scores. The model may take a number of forms. With a model that takes the form of a DNN, the model can be a variety of types including Faster-RCNN, R-FCN, SSD, RetinaNet etc. Given a model architecture, the model training involves continuously improving the parameters of the model using the dataset 116 until the parameters converge to an optimum value (local or global) as measured by a loss or cost function. One example of such a loss function is the weighted sum of the offsets of the detected bounding boxes for the objects compared to ground truth values, and the cross entropy between correct and detected object classes for those boxes. The offsets of the bounding boxes determine how well the model is learning to localize the objects correctly. Cross entropy measures how well the model is learning to classify the correct class of the object captured by the detected bounding box. At the end of this stage, a model Mk is produced which works as an object detector meaning it takes an image as an input and outputs a set of object bounding boxes (as coordinate values in the image), the corresponding object classes, and corresponding confidence scores.

Figure 11:
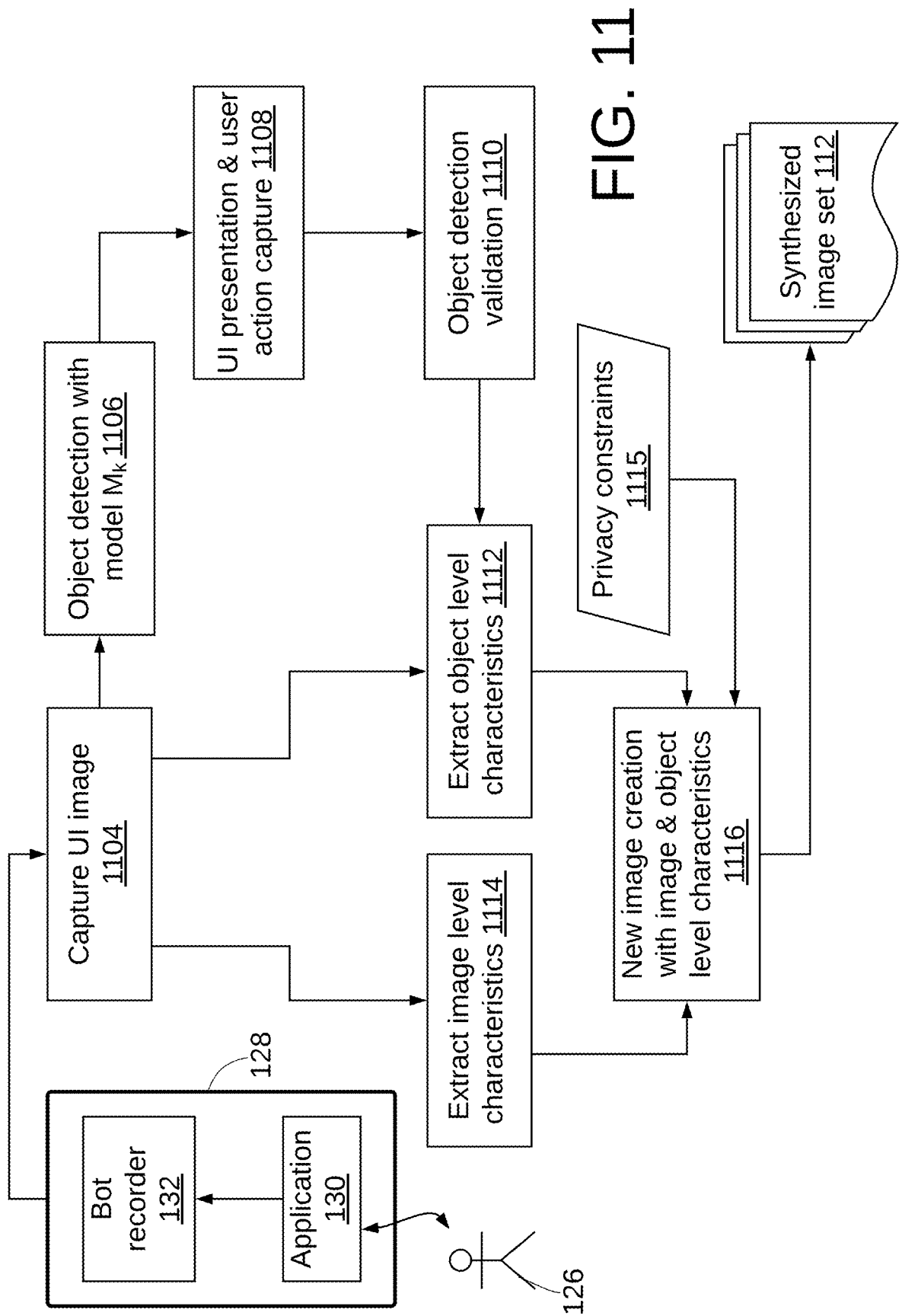
FIG. 11 is a flow diagram illustrating user action driven synthesis.
Figure 12:
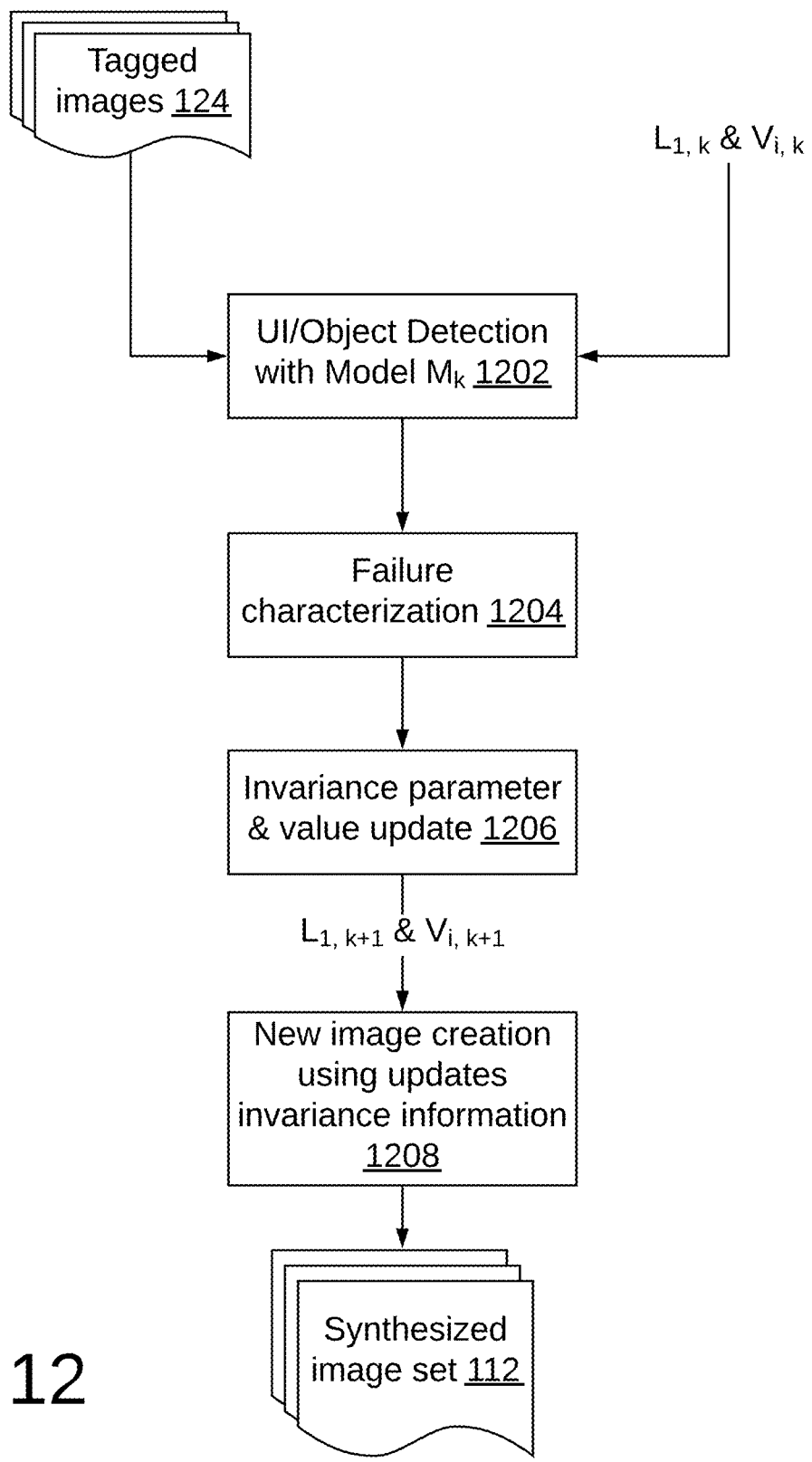
FIG. 12 is a flow diagram illustrating offline or passive synthesis.

In one embodiment, object detection and invariance parameter identification may be performed by breaking a UI object into certain constituent object parts, or component sub-objects, also referred to as sub-control objects, so that the constituent object parts have a limited variability range with respect to the invariance parameter and are amenable to be learned effectively by a machine learning model. For example, a textbox object which may have an object class "TEXTBOX" and an invariance parameter 'aspect ratio', may be broken down into two parts—(1) "LEFT_TEXTBOX" sub-object created using the left most part of the textbox object with the original height, and the width equal to the original height (2) "RIGHT_TEXTBOX" sub-object created using the right most part of the textbox object with the original height, and the width equal to the original height. Once a model learns to detect these sub-object parts, these sub-objects (i.e. "LEFT_TEXTBOX" and "RIGHT_TEXTBOX") are combined to construct the object "TEXTBOX". The trained model Mk is used by the data point generator 110 which identifies new instances of invariances and generates data to improve the model Mk. This may be performed by using (i) an unseen set of application UI screenshot examples 124 and/or (ii) a new user interaction session, by a user 126 via a device 128 of an application 130, employing a bot recorder 132 to synthesize new datapoints (i.e. images), to capture the new object and image level invariance scenarios present in the unseen set and/or the new user interaction session. Further details are shown in FIGS. 11 and 12. The new set of images synthesized at this stage 112 are then included at 114 into the current dataset $D_k$ and the process of learning (i.e. training new models) and incrementally synthesizing and augmenting dataset repeats.

Figure 13:
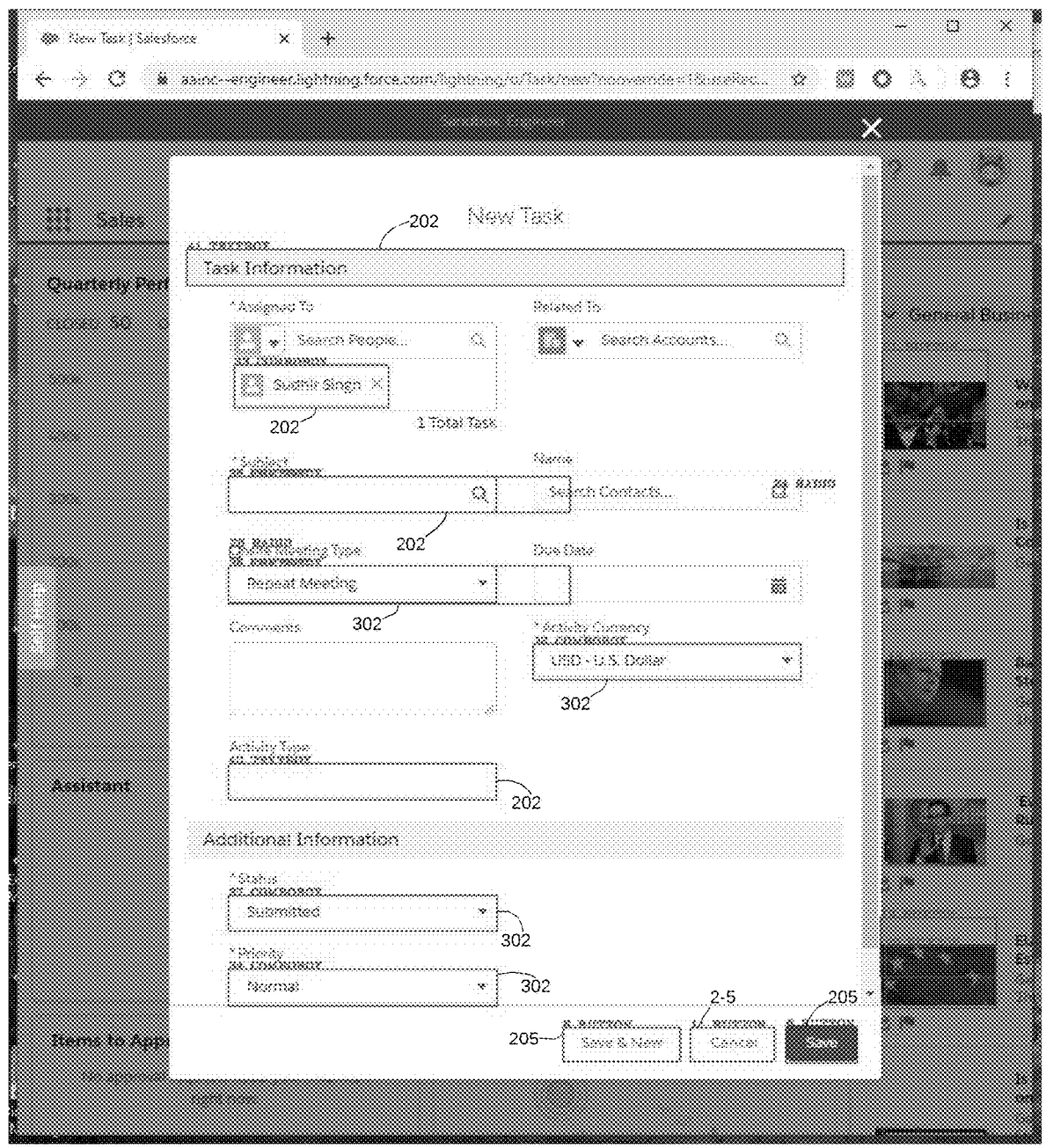
FIG. 13 is a screenshot showing an example output of the trained model of FIG. 1, at a step k.
Figure 14:
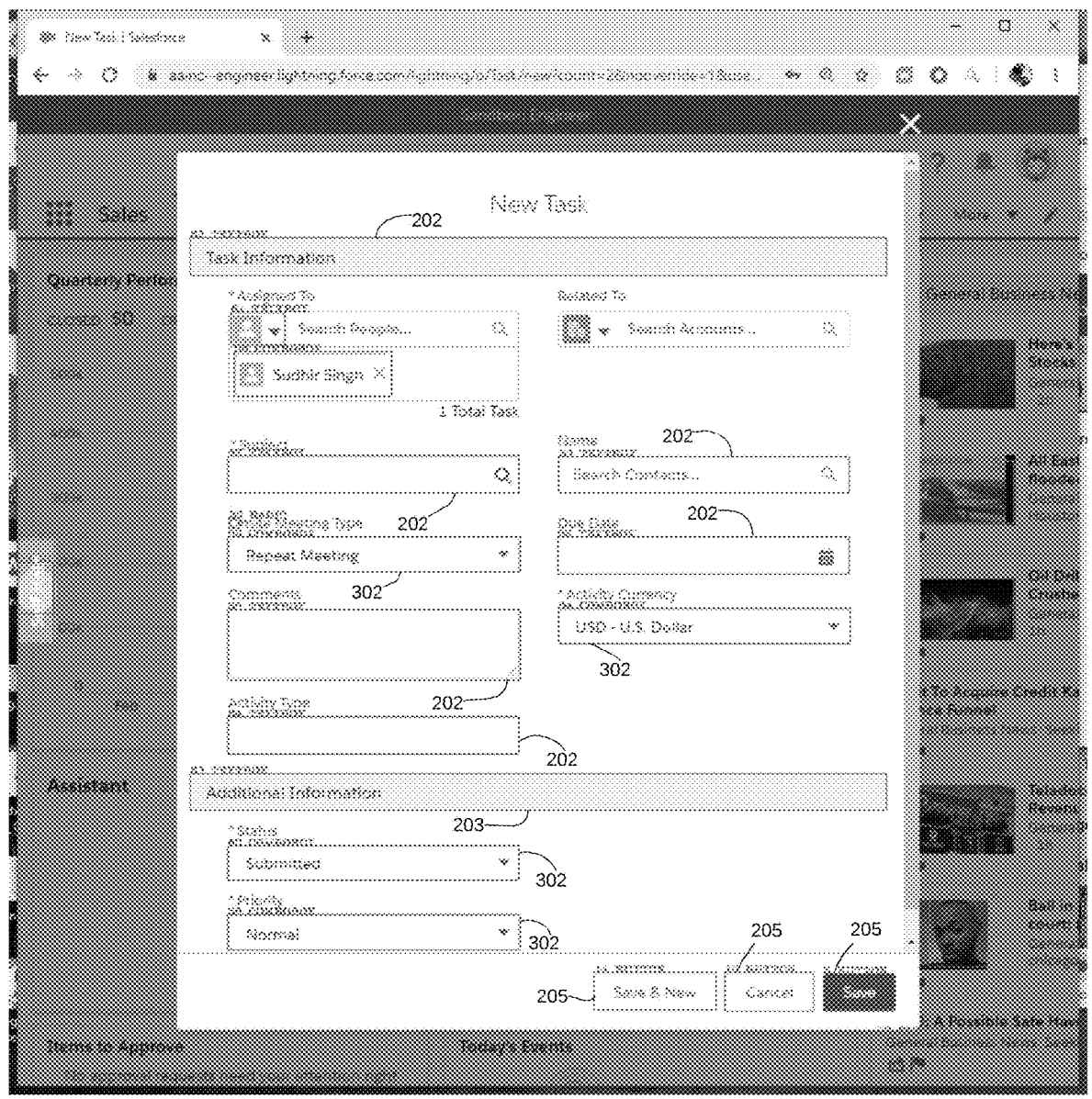
FIG. 14 is a screenshot showing an example output of the trained model of FIG. 1, at a step k+1.

FIGS. 13 and 14 illustrate how the quality of the model trained in this way improves. FIG. 13 shows the detections output of the object detection model at step k and FIG. 14 shows the detections output of the object detection model at step k+1. As seen in FIG. 13, a variety of UI control objects have been detected. As seen in FIG. 14, a variety of UI control objects have been detected. Note that the textboxes with search icons or calendar icons that were missing in step k (FIG. 13) are now detected correctly (in step k+1 (FIG. 14).

Figure 15:
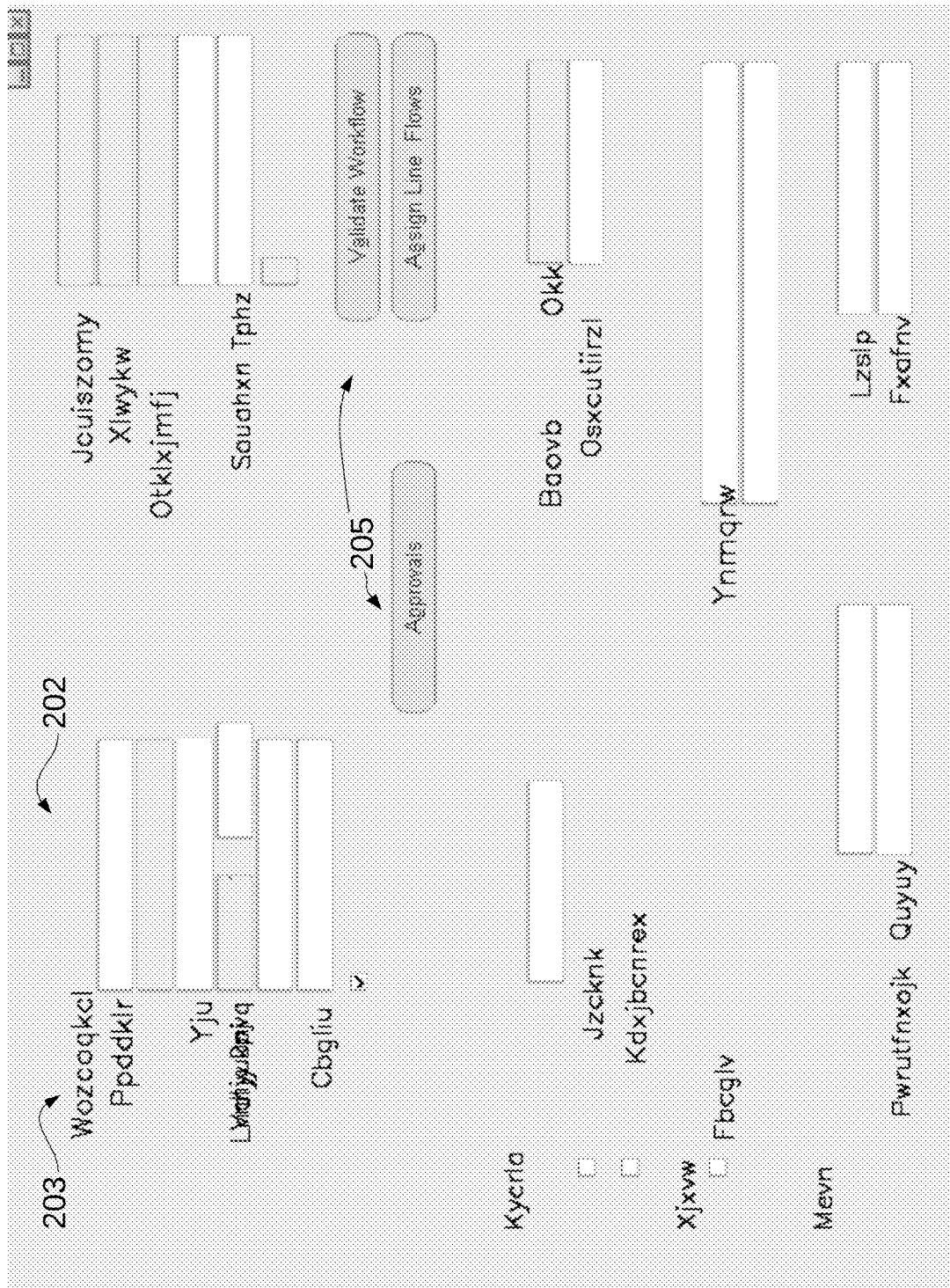
Figure 18:
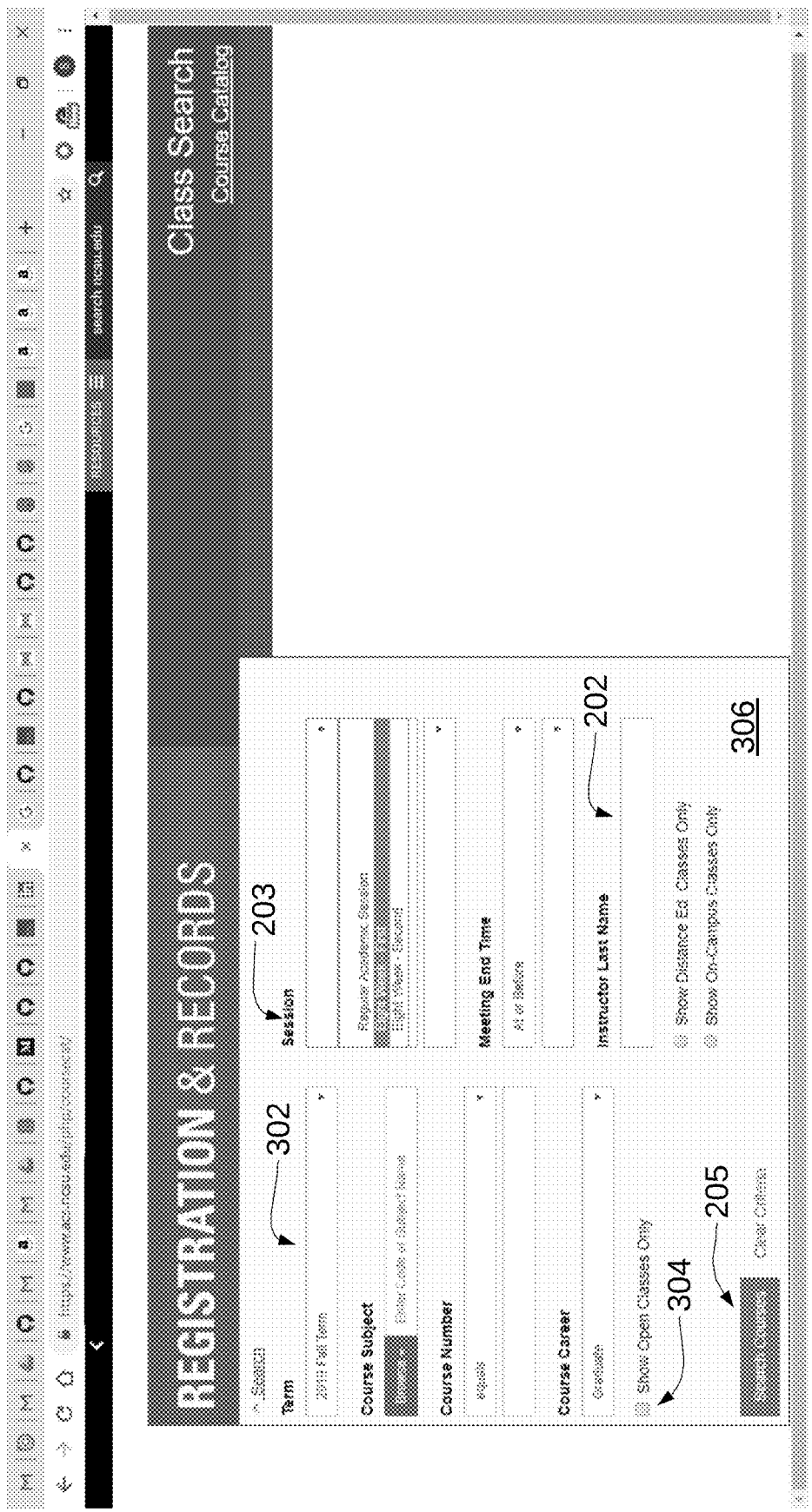
Figure 19:
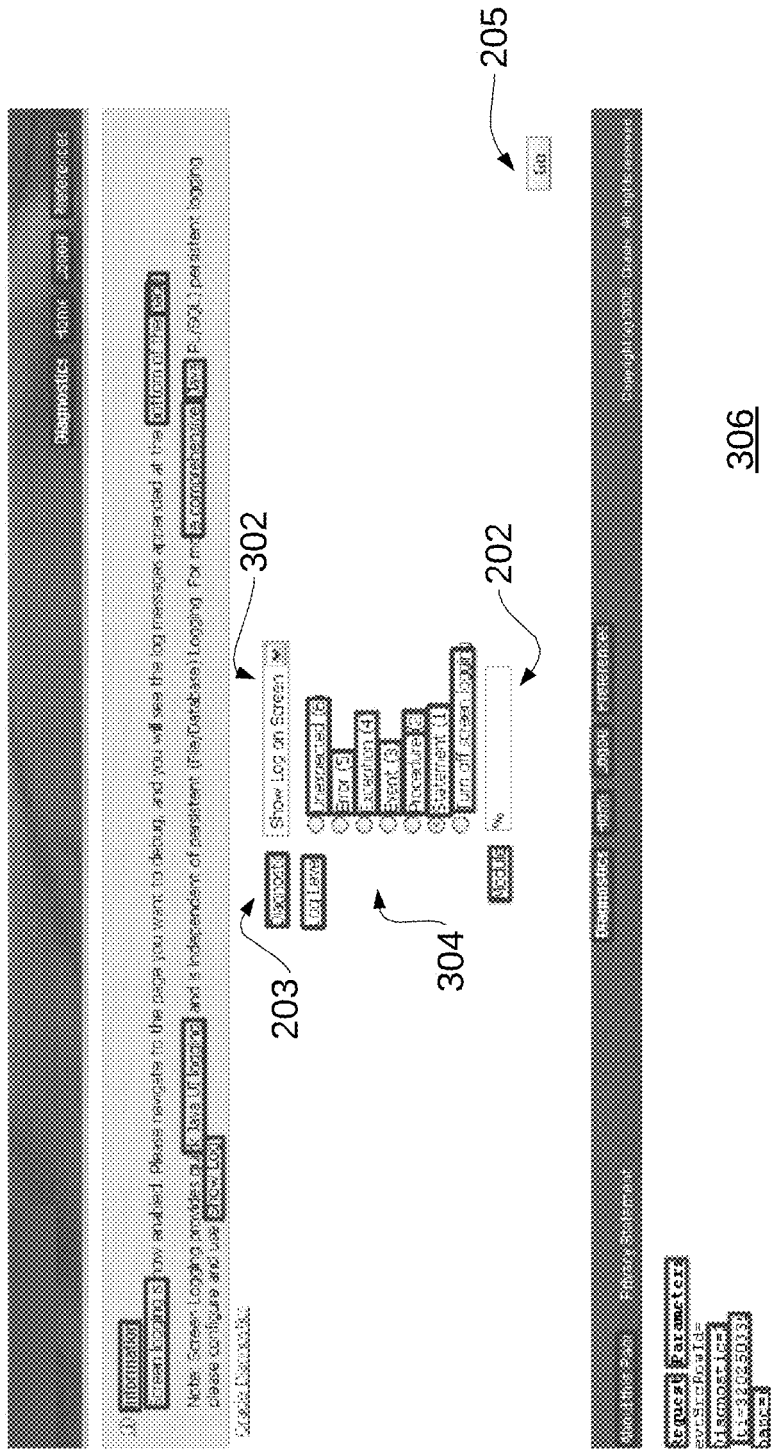
Figure 20:
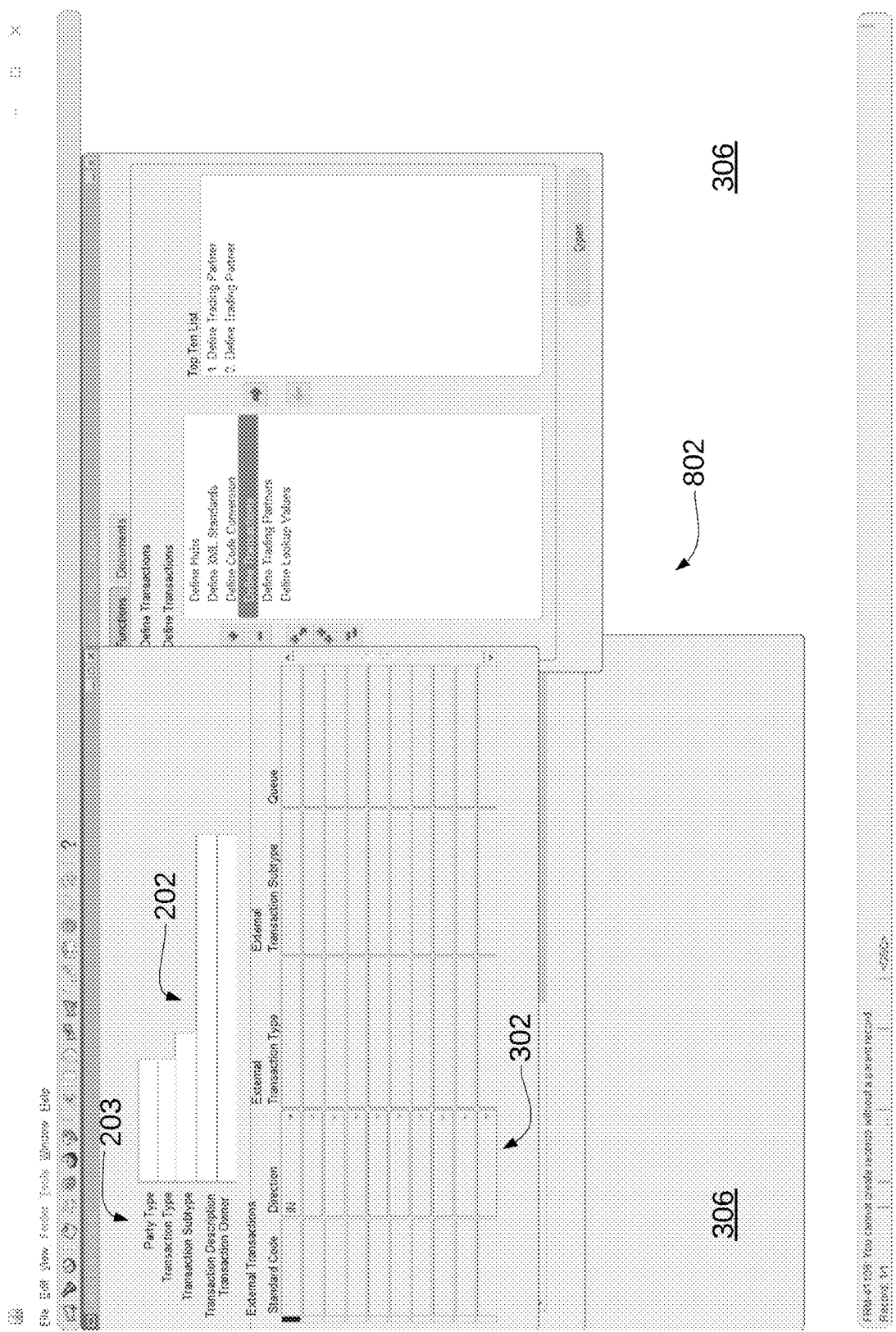
Figure 21:
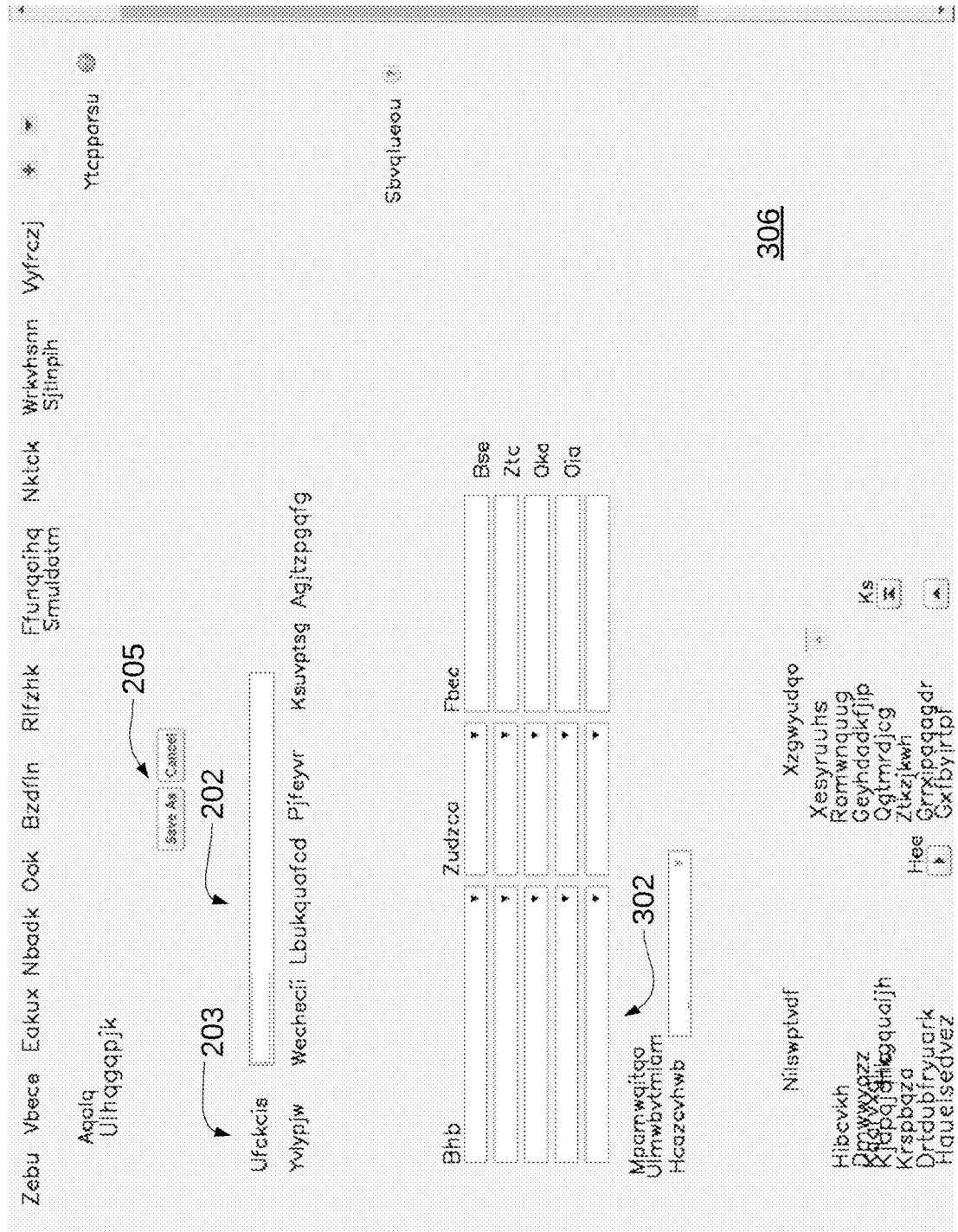
FIGS. 21, 22, 23, 24, 25, 26, 27, 28 and 29 are screenshots showing examples synthesized images based on the application screen images shown in FIGS. 17, 18, 19 and 20, respectively.
Figure 22:
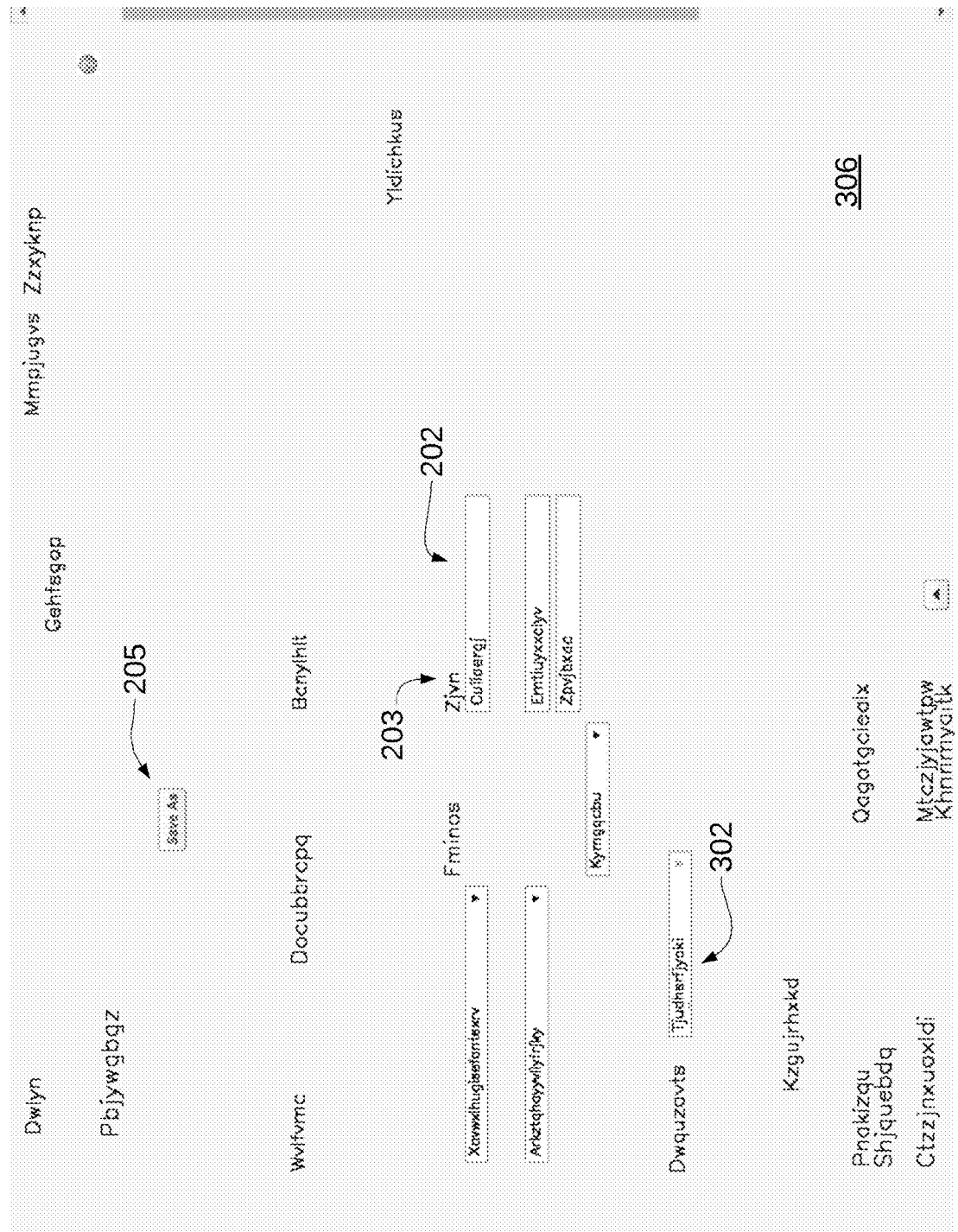
Figure 23:
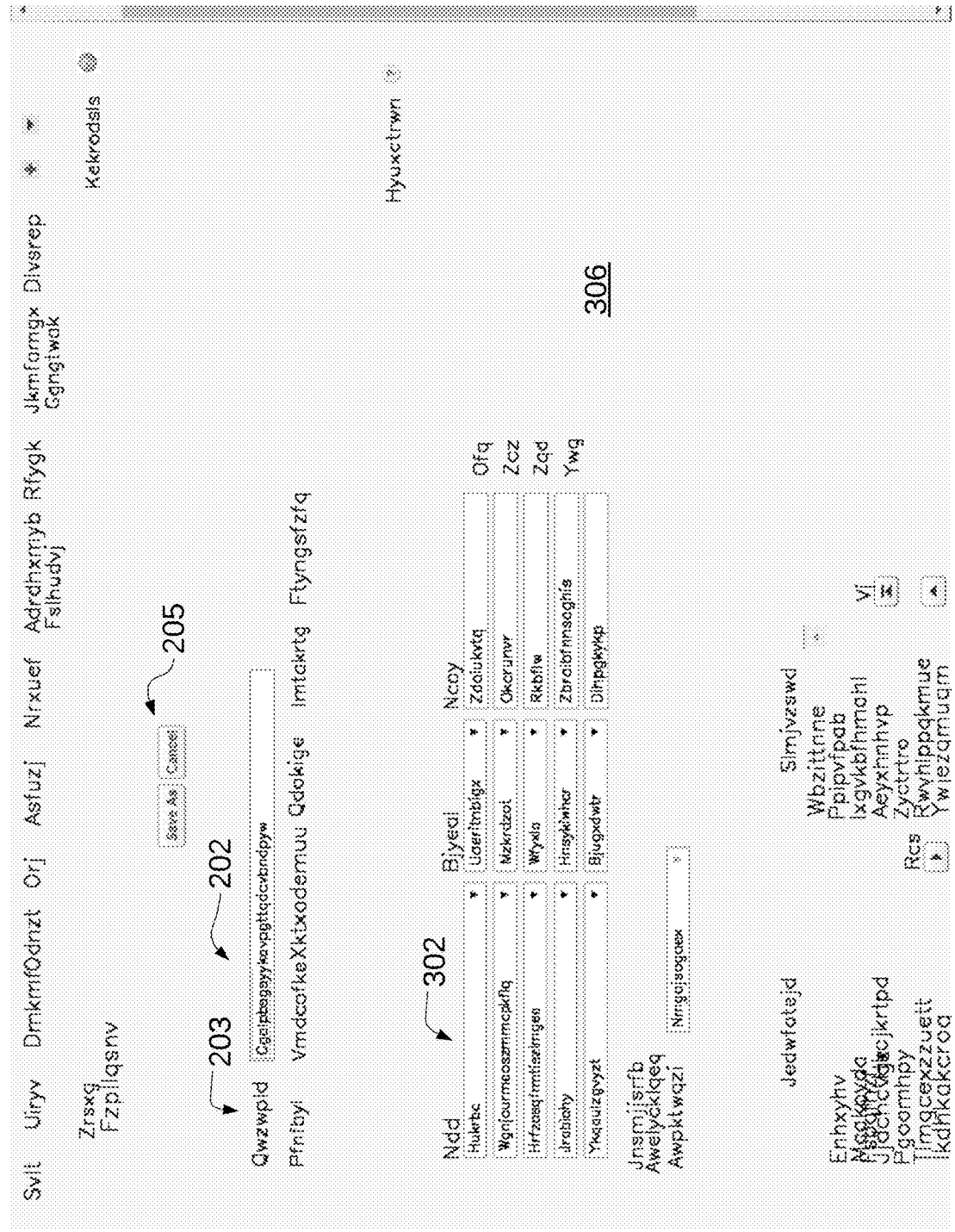
Figure 24:
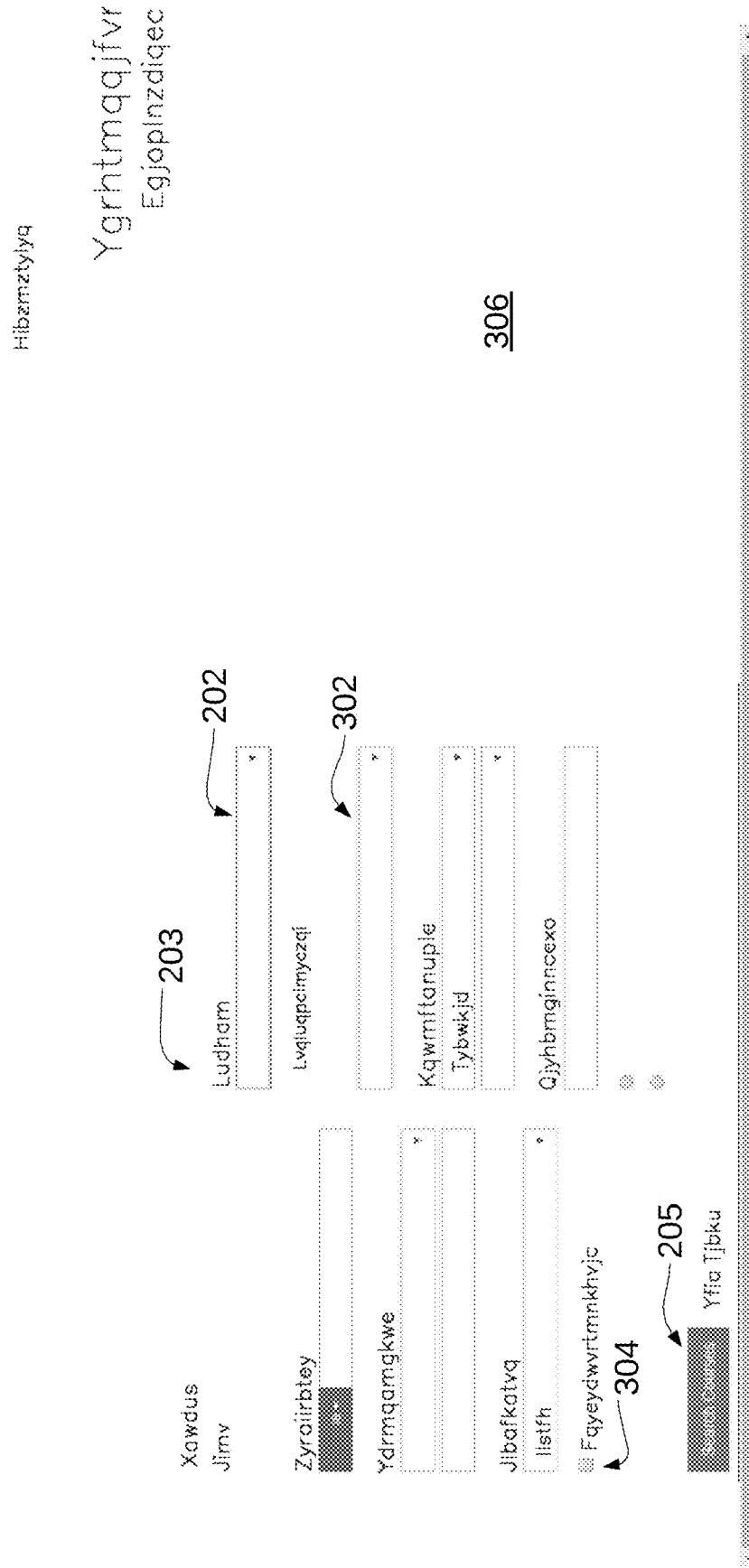
Figure 25:
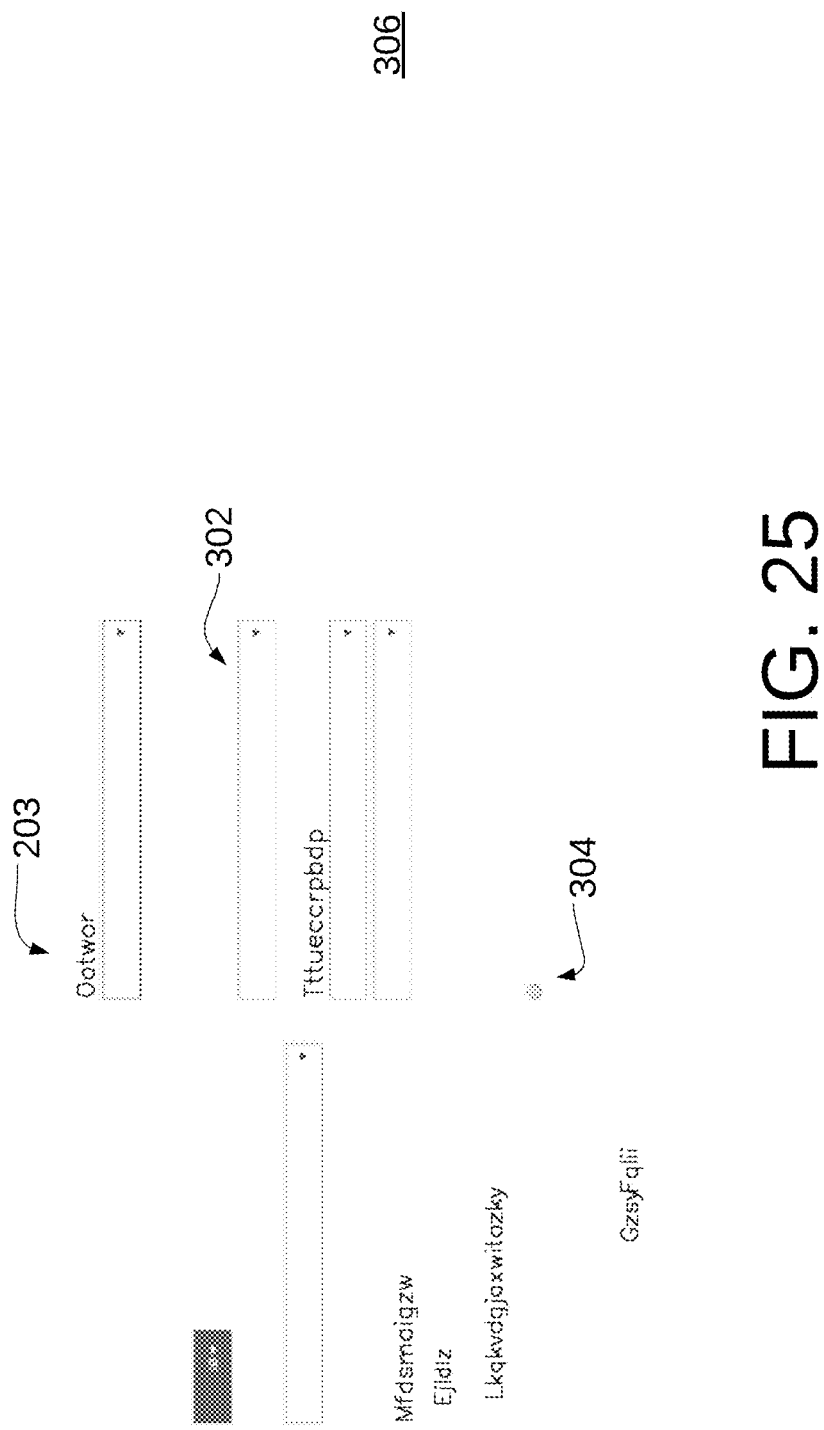
Figure 26:
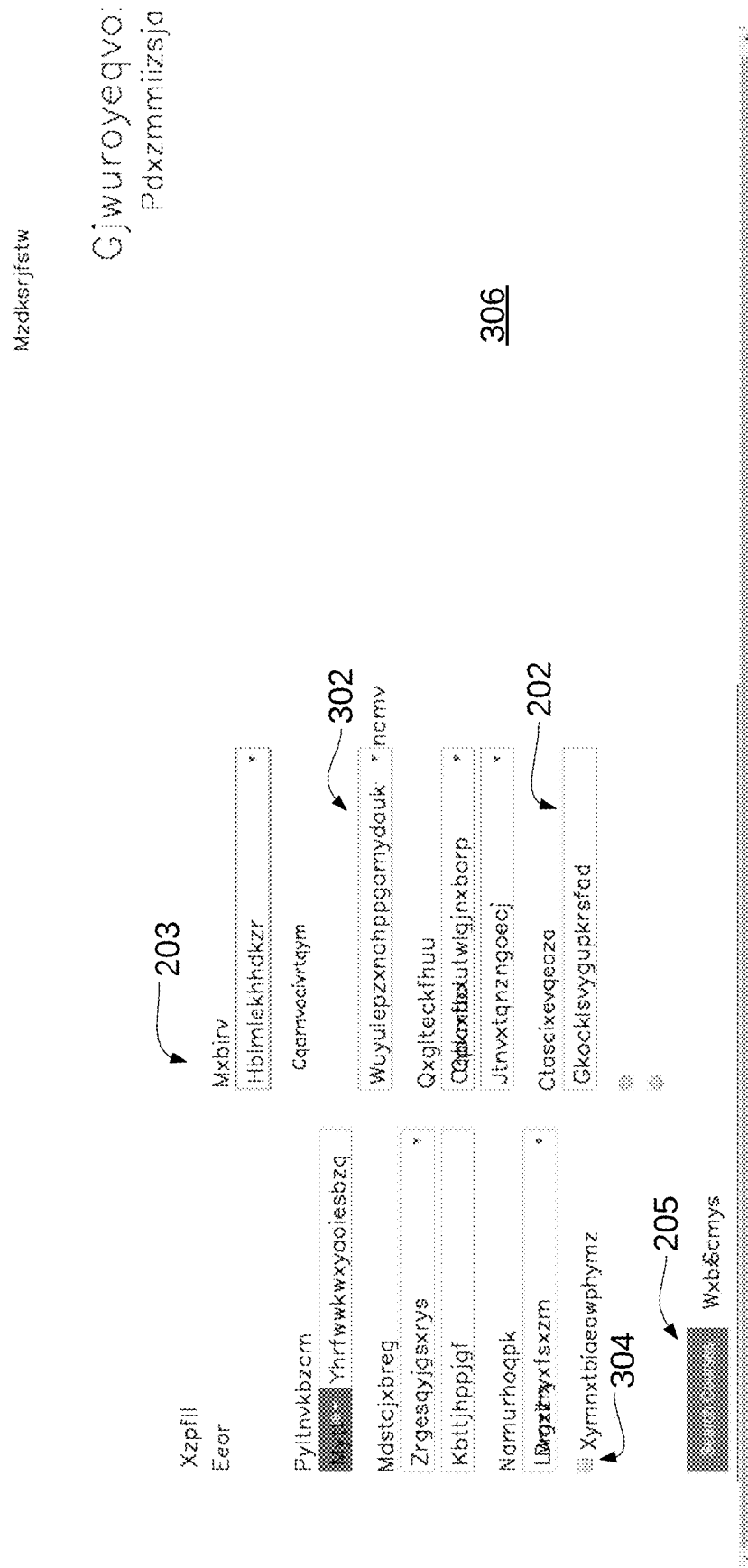
Figure 27:
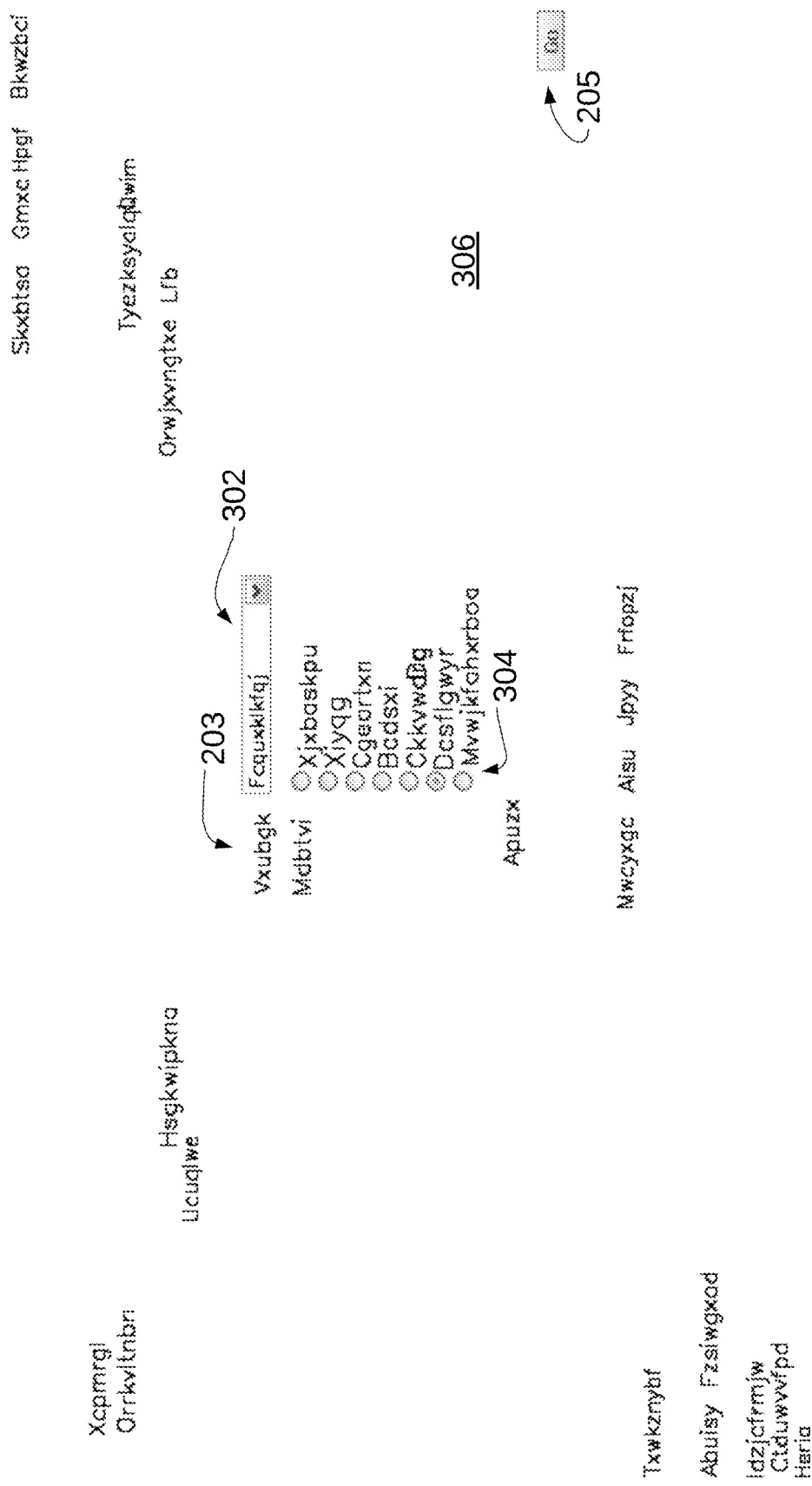
Figure 28:
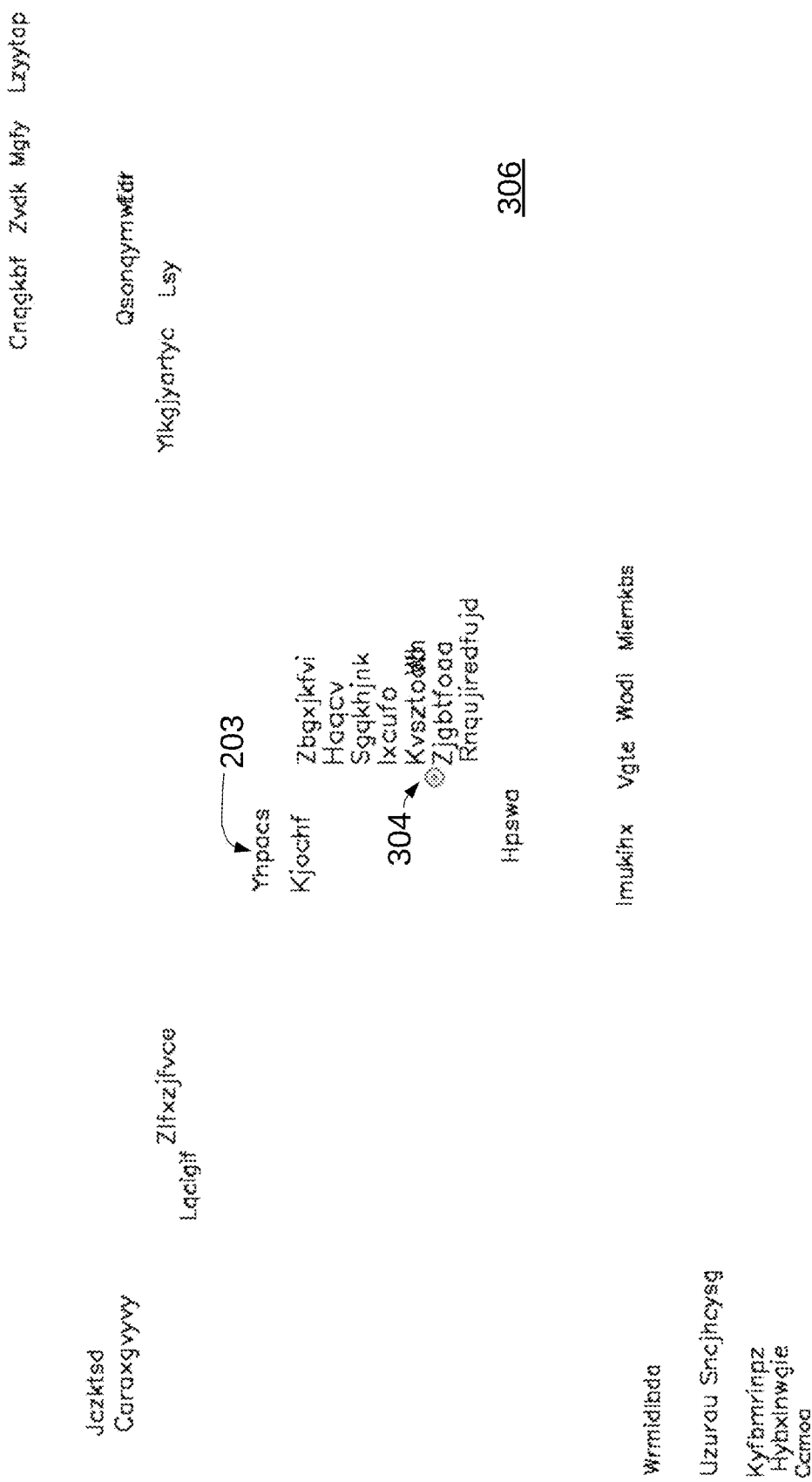
Figure 29:
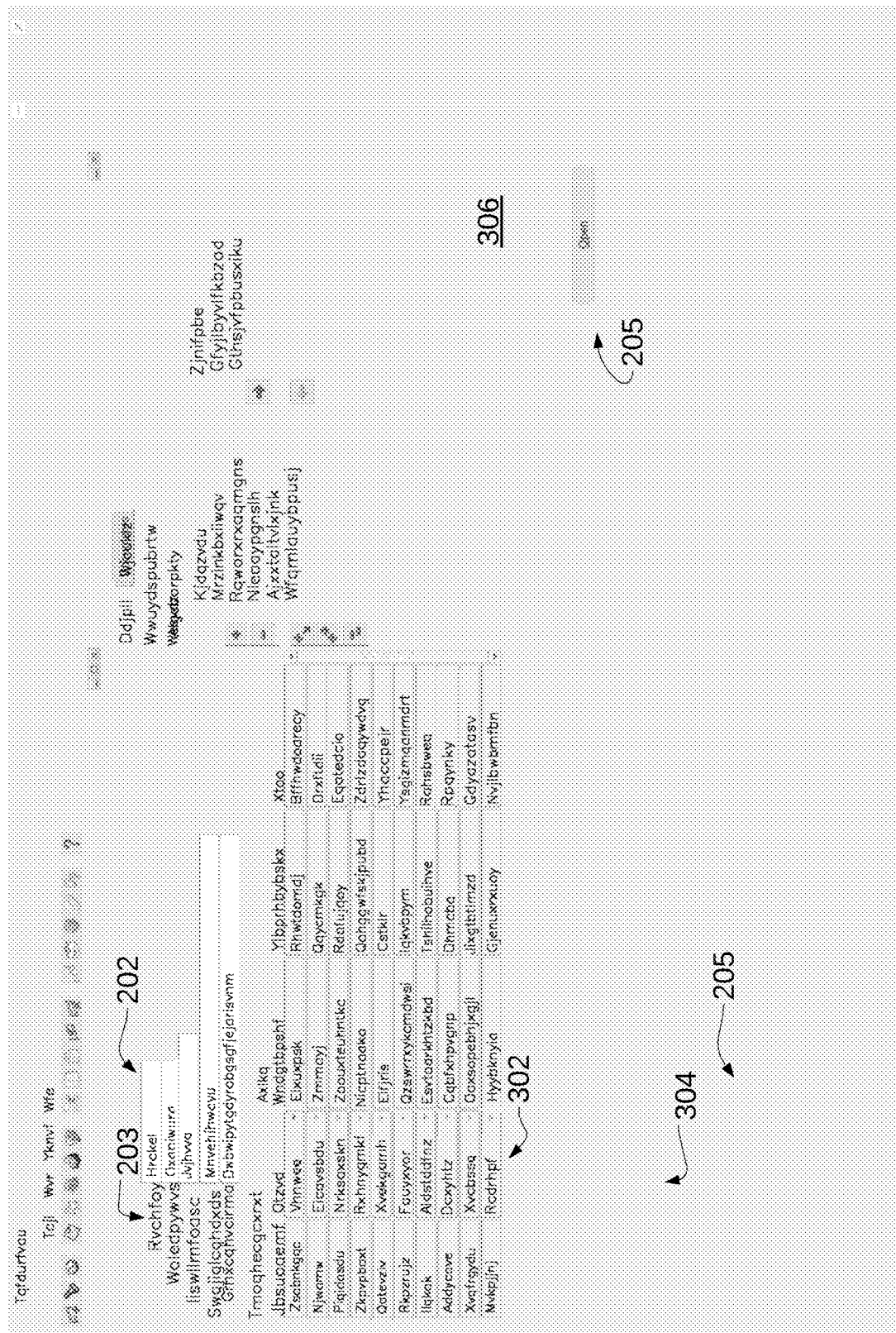

The operations to perform the user action driven synthesis 120 are shown in FIG. 11. An application UI, of application 130 is initiated at 1102 and one or more screenshots of this application UI is captured as images at 1104 by bot recorder 132 as user 126 uses the application 130. Each captured image is then at 1106 passed through the object detection model Mk which outputs a set of bounding boxes, the corresponding object class labels and the corresponding confidence scores. This object detection model Mk detects text on the captured image as well. Additionally, another model to perform automatic text detection may be used. This operation at 1106 generates a set of UI control objects and a set of text in the captured image all in the form of bounding boxes, object class labels and confidence scores. Further, a mapping between these UI control objects and texts may also be established. The detected UI control objects are then presented to the user at 1108 as part of the application 130 that the user 126 is interacting with. In one embodiment the presentation of detected UI control objects to the user 126 is performed by highlighting the detected UI control objects contained in an application screen presented to the user 126. The user 126 then performs the actions that he/she intends to do e.g. text entry, selecting from a combobox, selecting a checkbox or a radio button or clicking on a text or image button. The system 10 captures all of these actions, irrespective of whether a UI control object with which the user 126 interacts has been detected, by way of bot recorder 132. Depending upon the quality of the object detection model at this kth iteration of the synthesis, some of the detected UI control objects and texts may be wrong. Depending upon the action performed by the user on a UI control object, its class label is validated at 1110. For example, even though a TEXTBOX is wrongly detected as say a BUTTON, if the user 126 does a keyboard entry during interaction, the system identifies that the correct class is TEXTBOX and the model had made an error. In one embodiment, user 126 can further explicitly draw a bounding box for a control that is missing or incorrect and associate a right object class label to it. Therefore, either a detected UI control object is corroborated or corrected by the user action performed on that UI control object. These validated set of UI control objects are now used at 1112 to extract object level characteristics of the image. For each object, the value of associated invariance parameters are calculated—parameters such as background color of the object, border styles, present or absence of text, dimensions, shapes, actual pixel values of the interesting part of the objects etc. In addition to the object level characteristics or invariances, the originally captured application UI is further used to compute at 1114 image level characteristics or invariances such as overall background color, layout styles, geometric arrangement or alignment of the UI control objects etc. These two sets of invariance parameter values are then used at 1116 to synthesize one or more images. At this point, a set of privacy constraints 1115 may be applied as well. The privacy constraints 1115 dictate what information must be erased or replaced in the original image. In one embodiment, a synthesized image is created with monochromatic background color which is the dominant color computed from the original image, and all the UI control objects are drawn at their exact locations in the original image with uniform colors inside them with value equal to their corresponding dominant colors in the original image, thereby erasing any textual input they might have inside them. The text values are all replaced by a set of random strings and are placed at the locations where text was present in the original image. As seen, such an embodiment operates to use the style of a UI control without the associated content. Additional images are synthesized by choosing a subset of the UI control objects and a subset of the original text locations and placing them on an image with uniform background or one of the various calculated layouts from the original image. A subset of the textboxes and comboboxes may further be entered with a random string each. For the original application UI depicted in FIG. 2A, FIGS. 15 and 16 provide additional examples of synthesized images. In FIG. 15 each of the UI control objects has been retained, with the exception of the tabs at 208, the text has been removed with random text being added as labels and the text fields being empty. FIG. 16 is similar with the labels 203 being different than in FIG. 15 with random text being added to the text fields 202. Similarly, FIGS. 21-29 are some examples of synthesized images for the original application screen images shown in FIGS. 17-20 respectively. The synthesized images include various combinations of textboxes 202, labels 203, buttons 205, dropdowns 302, checkboxes 304, background colors 306 (shown in greyscale) and windows 802. As can be appreciated, a single application UI image can result in many images, in some cases at a 10:1 or higher ratio.

The offline or passive synthesis 122 is now described with respect to FIG. 12 to synthesize images to mimic given application UIs. At a kth iteration of the incremental learning, $L_{l,k}$ is the known list of invariance parameters and $V_{l,k}$ is the set of values associated with invariance parameters. In the beginning operation 1202, these parameters and values ($L_{l,k}$ and $V_{l,k}$) are computed simply based on object properties as described previously in context of the initial dataset creation. Given a new set of application UI Images which may additionally come tagged with correct object bounding boxes and their object classes, the model Mk is applied on the images. For each image, the model outputs a set of detected bounding boxes, corresponding object class labels and the confidence scores. The tagging may be performed manually by users of an application program. Alternatively, the tagging may be performed semi-automatically. For example, a second image might be just a simple modified version of a first image where certain action on controls has been performed (e.g. text entry in a TEXTBOX, click on a CHECKBOX). In this case the UI control object class and location for each control in the second image is the same as that in the first image and can be tagged as such automatically.

Figure 30:
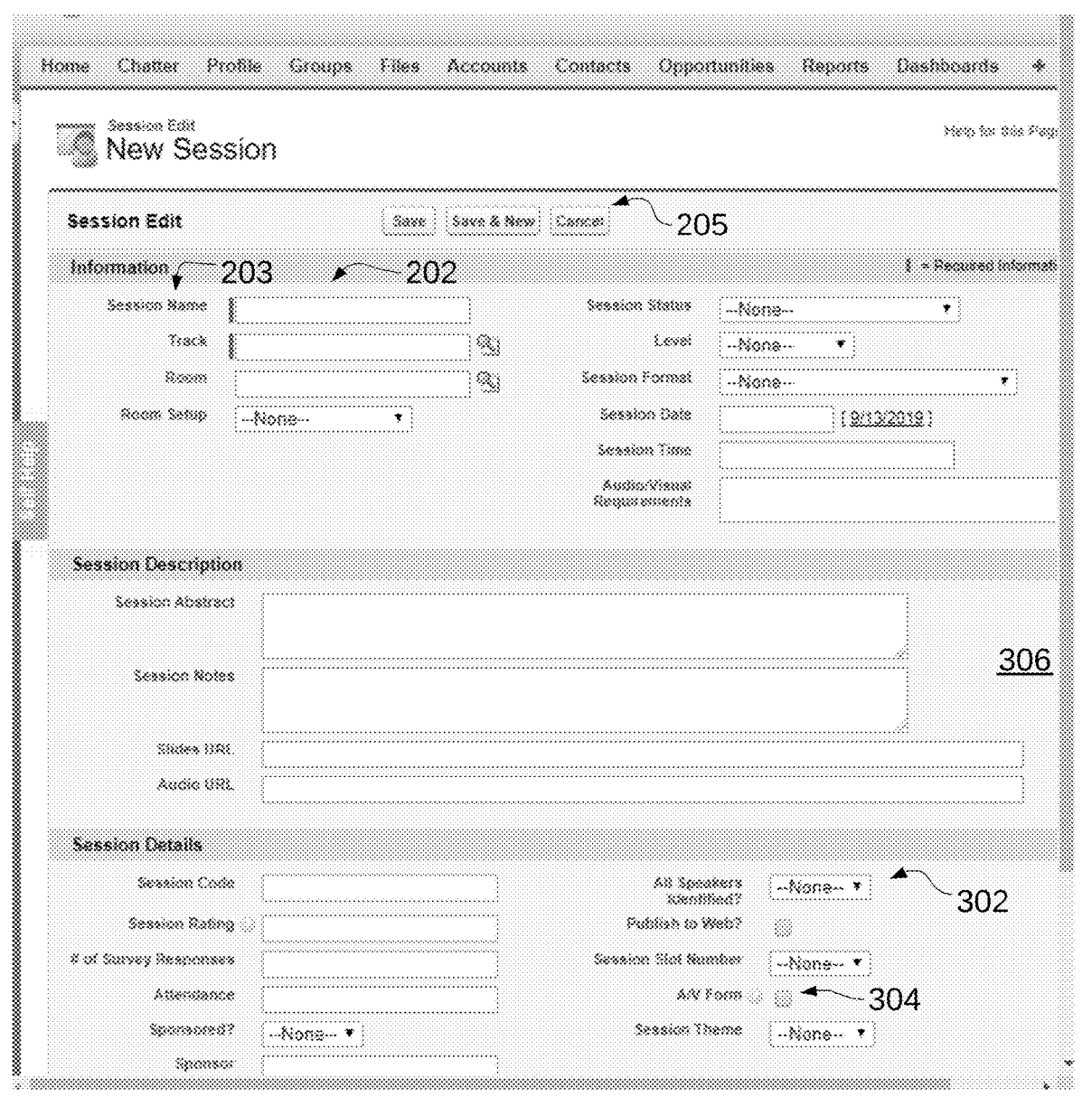
Figure 31:
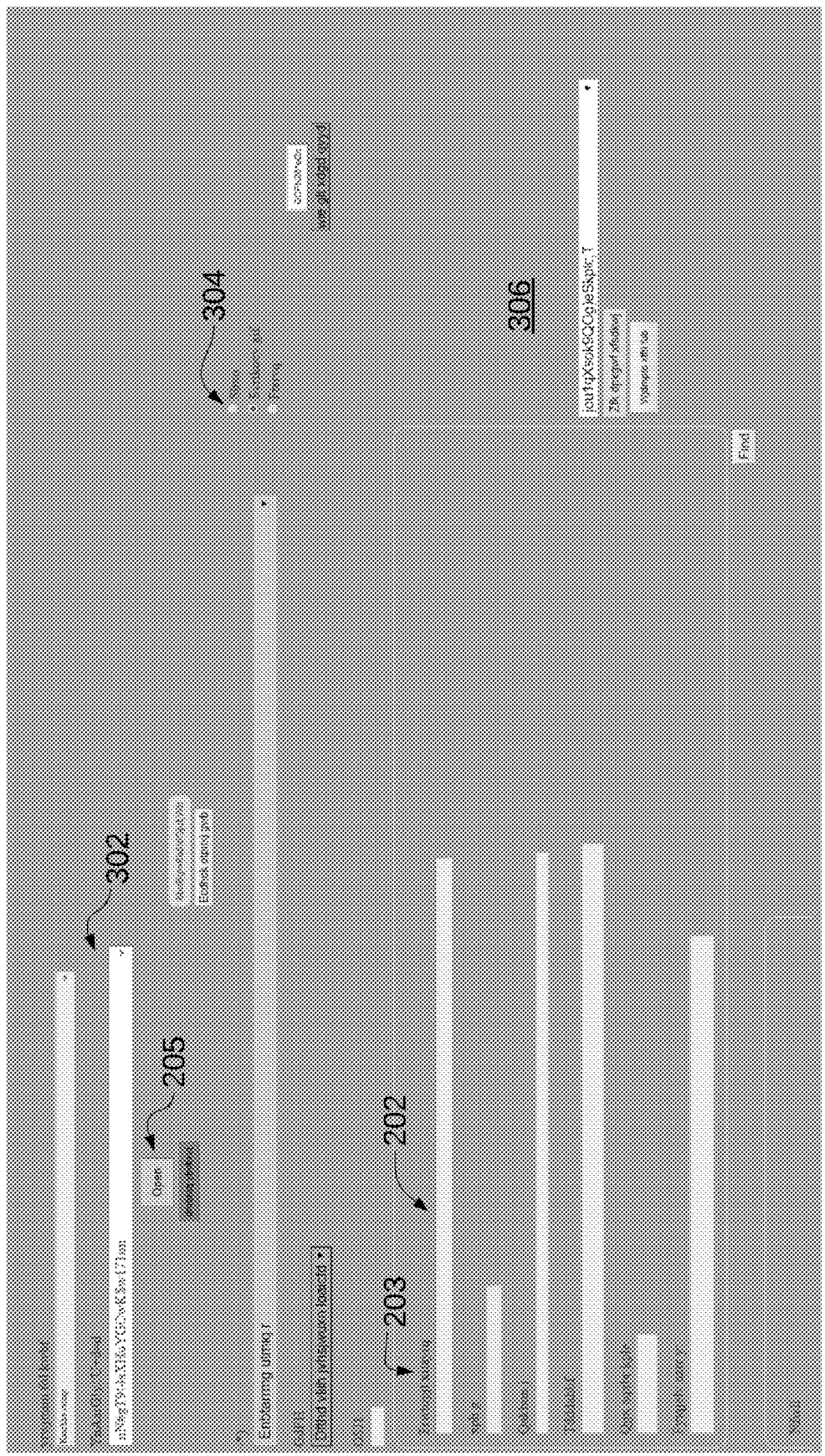
Figure 32:
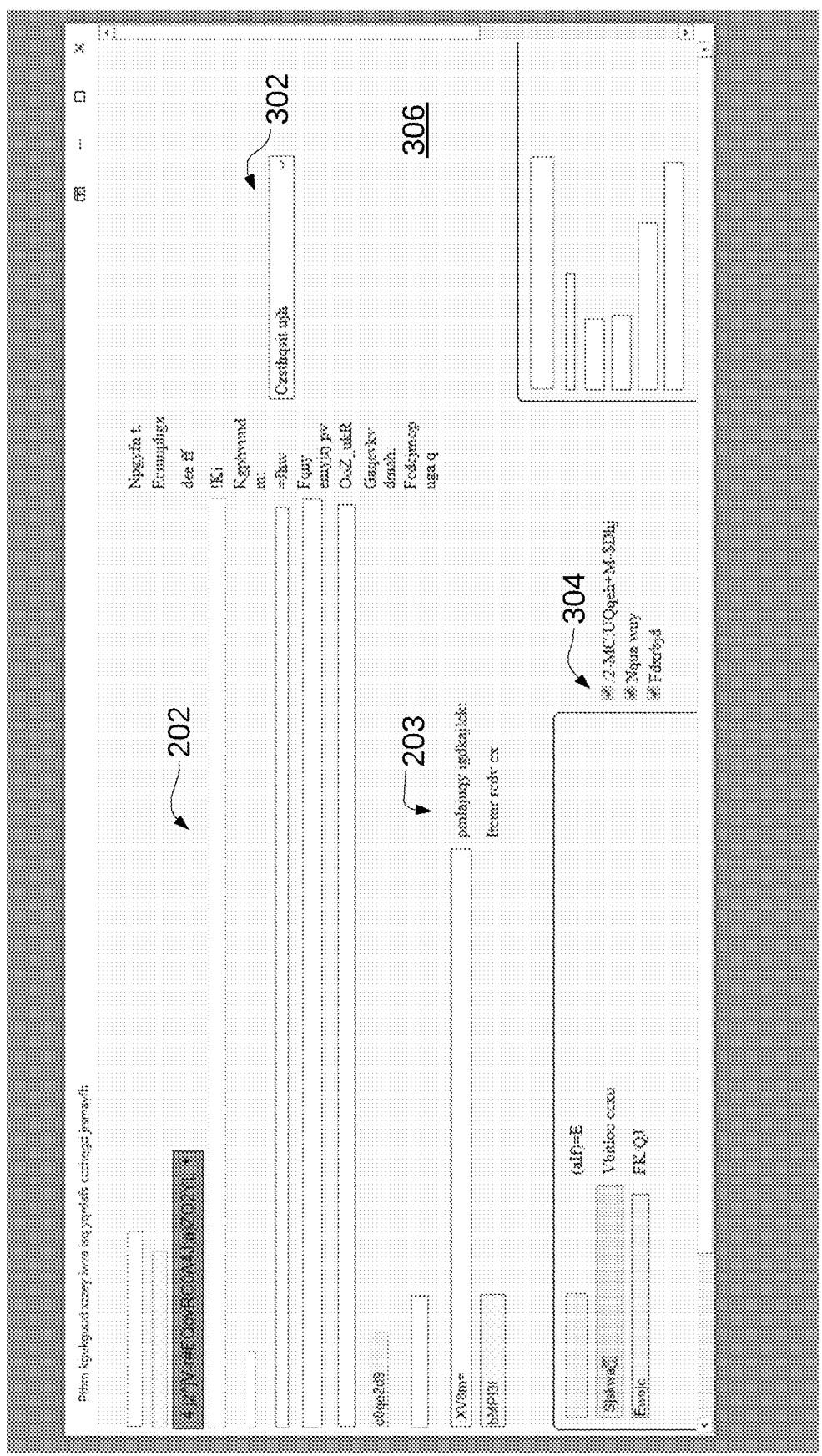
Figure 33:
Figure 34:
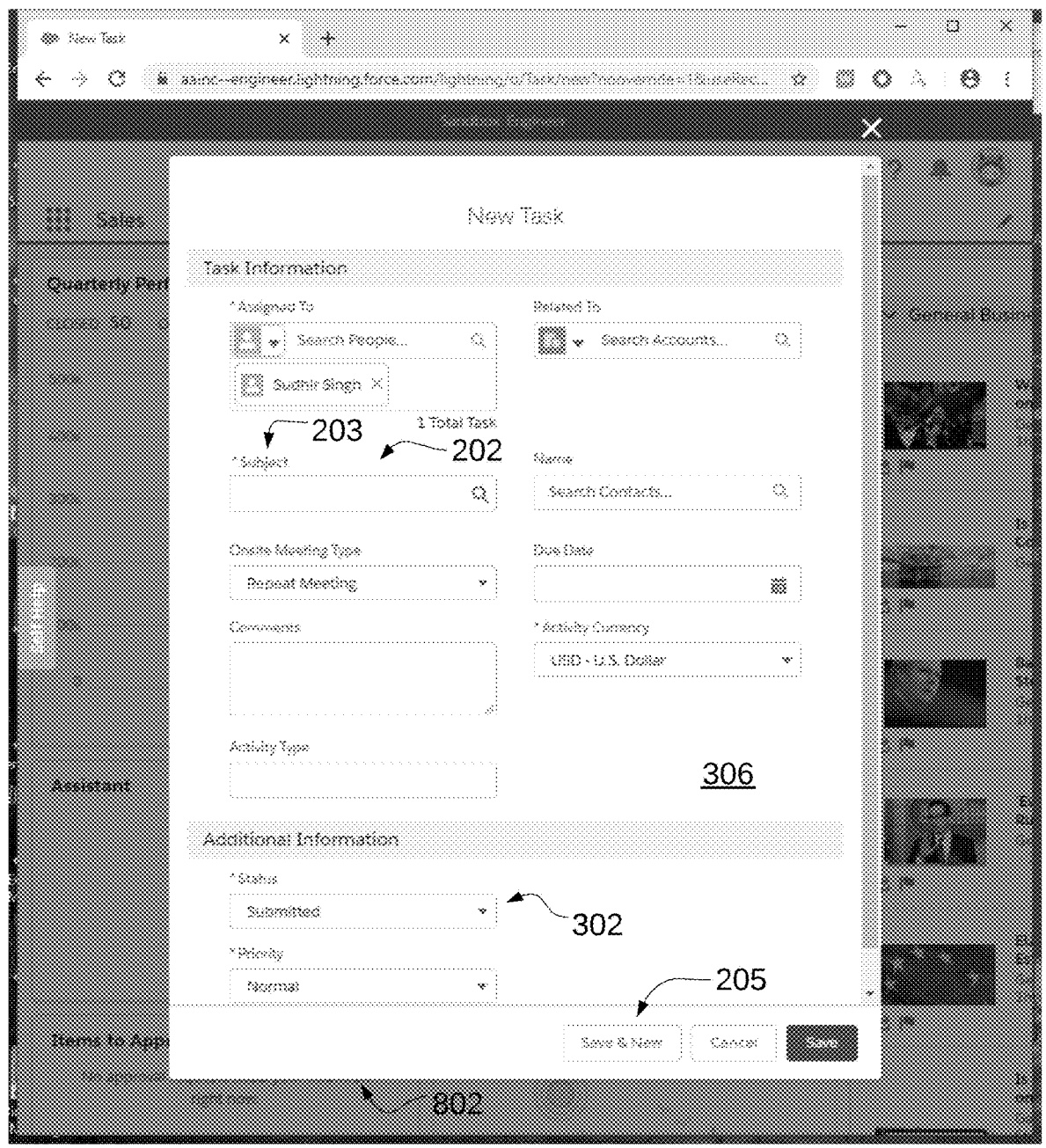
FIGS. 34, 35, 36 and 37 are screenshots of showing a second example of synthesized images.

For each object instance in each of the images, the model may detect a correct bounding box as per an overlap measure, a correct or incorrect class for the bounding box, or it may completely miss that object instance. The misses as well as incorrect predictions are designated at 1204 as failure cases. For each case where an expected object is either detected incorrectly or is missing, every invariance parameter associated with that object class is collected along with the correct values for the invariance parameters on the object instances in the object class. This failure characterization operation results in update of invariance parameters and values at 1206 that were unseen before, $V_{l,k+1}$ and $L_{l,k+1}$ respectively. For example, for UI control object class "TEXTBOX", if the model fails on application UIs with very wide textboxes, the values for invariance parameters "aspect_ratio" and "width" gets updated. In another example, where a new kind of textbox is seen with a search icon on the right side, a new invariance parameter called "icon style" will be added to the set of invariance parameters of object class "TEXTBOX" with a value equal to "search icon". The updated values are then used to synthesize new images at 1208 wherein the objects with the properties satisfying the new invariance parameter and values appear. In the first example, shown at FIGS. 30-33, the synthesized images will include wide textboxes along with other size textboxes. The screen images shown in FIGS. 31, 32 and 33 are synthesized from the screen image shown in FIG. 30 along the invariance parameter "width" with larger values i.e. very wide boxes. As can be seen, there is a wide variety in the synthesized images in FIGS. 31, 31 and 33 between each other and from the original image of FIG. 30. The number, type, background color (shown in greyscale) and aspect ratios of the UI control objects vary widely among the synthesized images and from the original. The synthesized images include various combinations of textboxes 202, labels 203, buttons 205, dropdowns 302, checkboxes 304, background colors 306 (shown in greyscale) and windows 802. The disclosed embodiments operate to capture wide textboxes in a variety of contexts both at the UI control object and image level.

Figure 35:
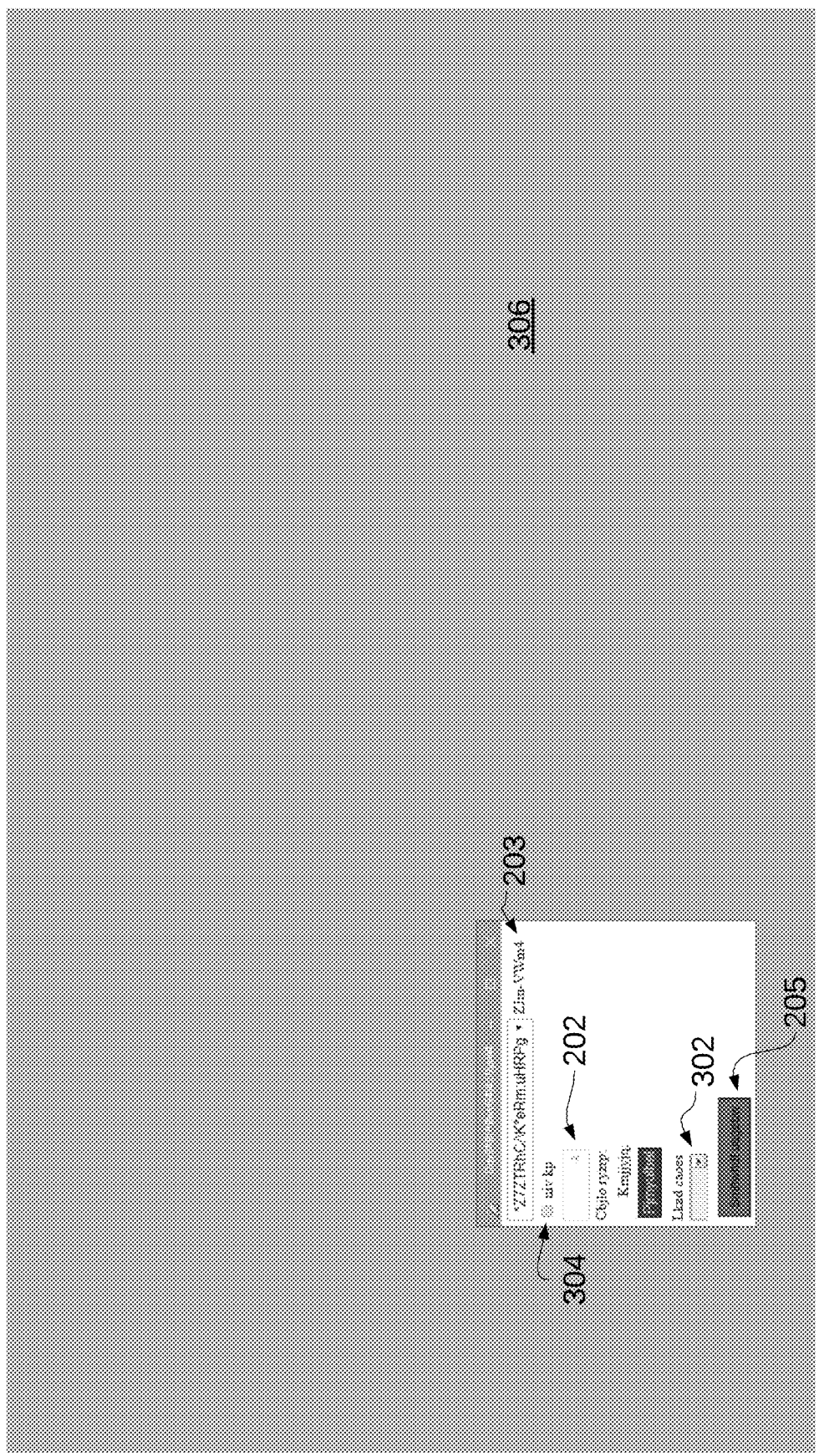
Figure 36:
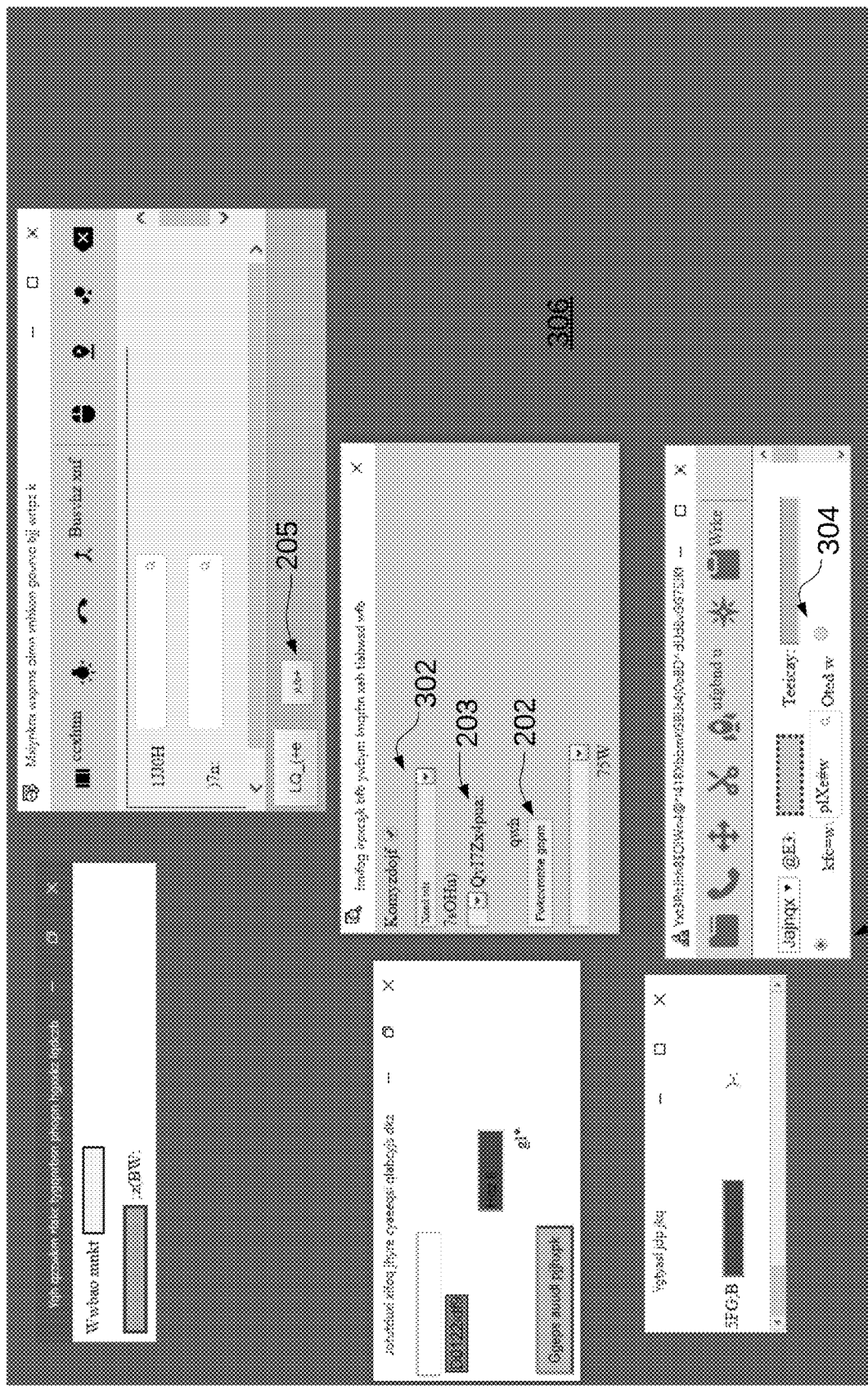
Figure 37:
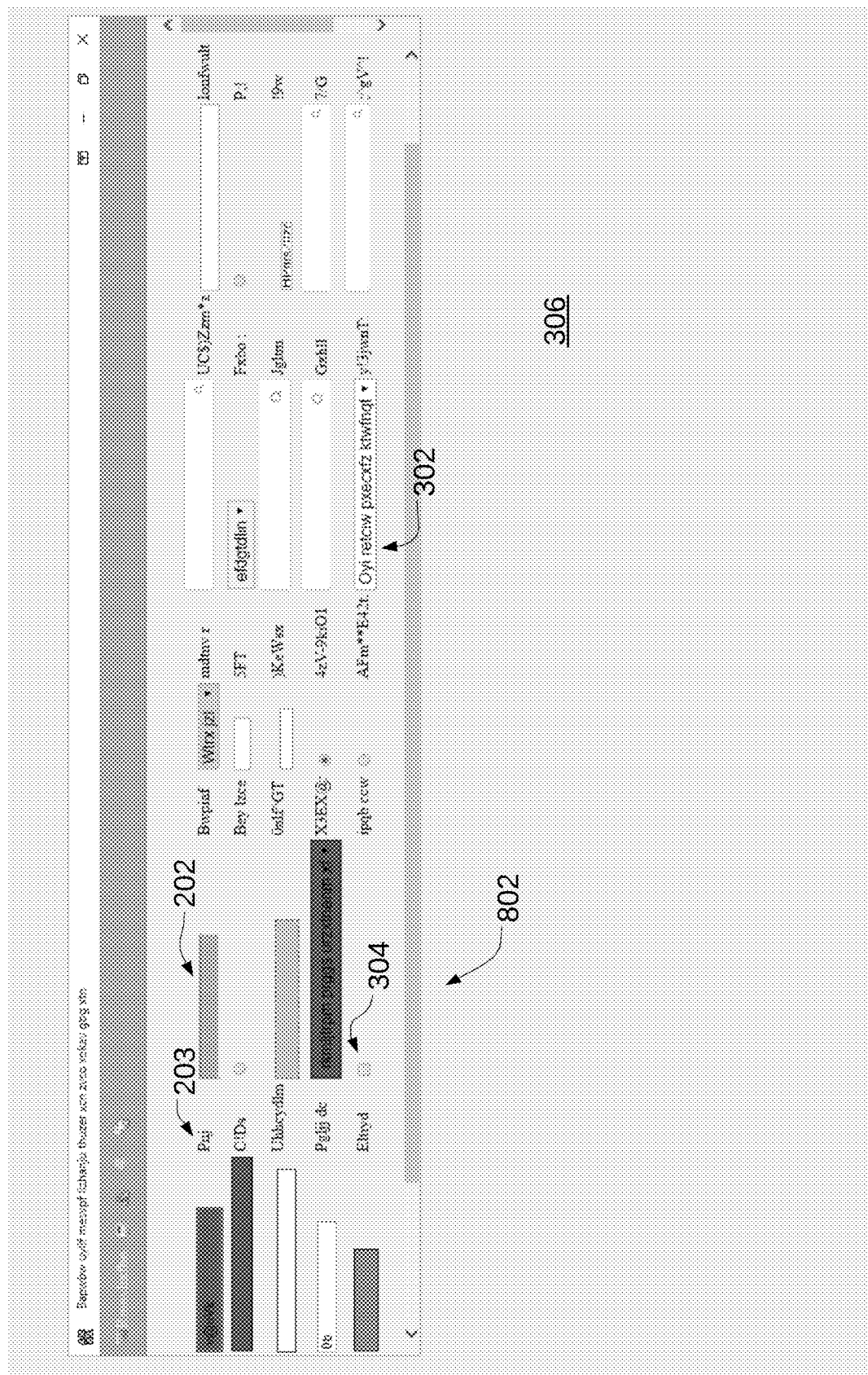

In the second example, shown at FIGS. 34-37, synthesized images will include textboxes with search icons inside them. The screen images in FIGS. 35, 36 and 37 are synthesized from the screen image in FIG. 34 along the invariance parameter "icon style" with a new value of "search icon". As can be seen, there is a wide variety in the synthesized images in FIGS. 35, 36 and 37 between each other and from the original image of FIG. 34. The "New Task" overlay of FIG. 34 results in the synthesized image of a single, smaller window in a larger screen shown in FIG. 35, multiple, smaller windows in a larger screen in FIG. 36, and the wide horizontal UI portion of a larger window in FIG. 37. The key idea is to capture the "search icon" in variety of contexts both at object and image level.

The system 10 exhibits a number of advantages in accurately recognizing application controls. One, it is self-supervised meaning that it does not require extensive human labeling of data. Second, it is privacy aware meaning it respects the privacy constraints imposed by the owner of the applications (e.g. no sharing of sensitive information). Third, it allows creation of a large and varied dataset as is required to train a model for UI control detection that is robust and accurate on real application screens. Fourth, it is agnostic to applications, application frameworks, and computing environments.

Although the embodiments described herein are set forth in the context of UI UI control object detection, the disclosed embodiments may also be employed in other machine learning environments where the solution and data collection is constrained by privacy requirements and constraints. Moreover, other embodiments, may recognize objects in document images other than those generated by software application programs. Such document images typically would have well-defined objects inside the documents. This is true for any number of business documents such as invoices, claim forms, and other such documents. Such documents contain objects such as address blocks, tables, signatures, and other structured information blocks and associated invariance parameters based on the properties of those objects. In embodiments that process such document images, the offline or passive synthesis 122 operates as described herein. The user action driven synthesis 120 in such an embodiment may operate by notifying and requesting interaction by a user 126 when the model fails (e.g. when a model would be expected to detect an object type in the document but fails to detect it). In such an instance, the user 126 corrects or completes the object detection where the model failed. This interaction is captured and data point generator 110 generates additional document images for further training of the object detection model as described herein.

The detected controls may be employed in a robotic process automation system. In such a system, a software robot (also referred to as a bot) comprises a plurality of sets of task processing instructions. Each set of task processing instructions is operable to interact at a user level with one or more designated user level application programs (not shown). A bot that employs the detected controls can operate to detect application controls in an application in an environment where only the application screen image is available to the bot. With the detected application controls, the bot can perform the task processing instructions to interact with the application(s) specified in the task processing instructions.

The embodiments herein can be implemented in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

Figure 38:
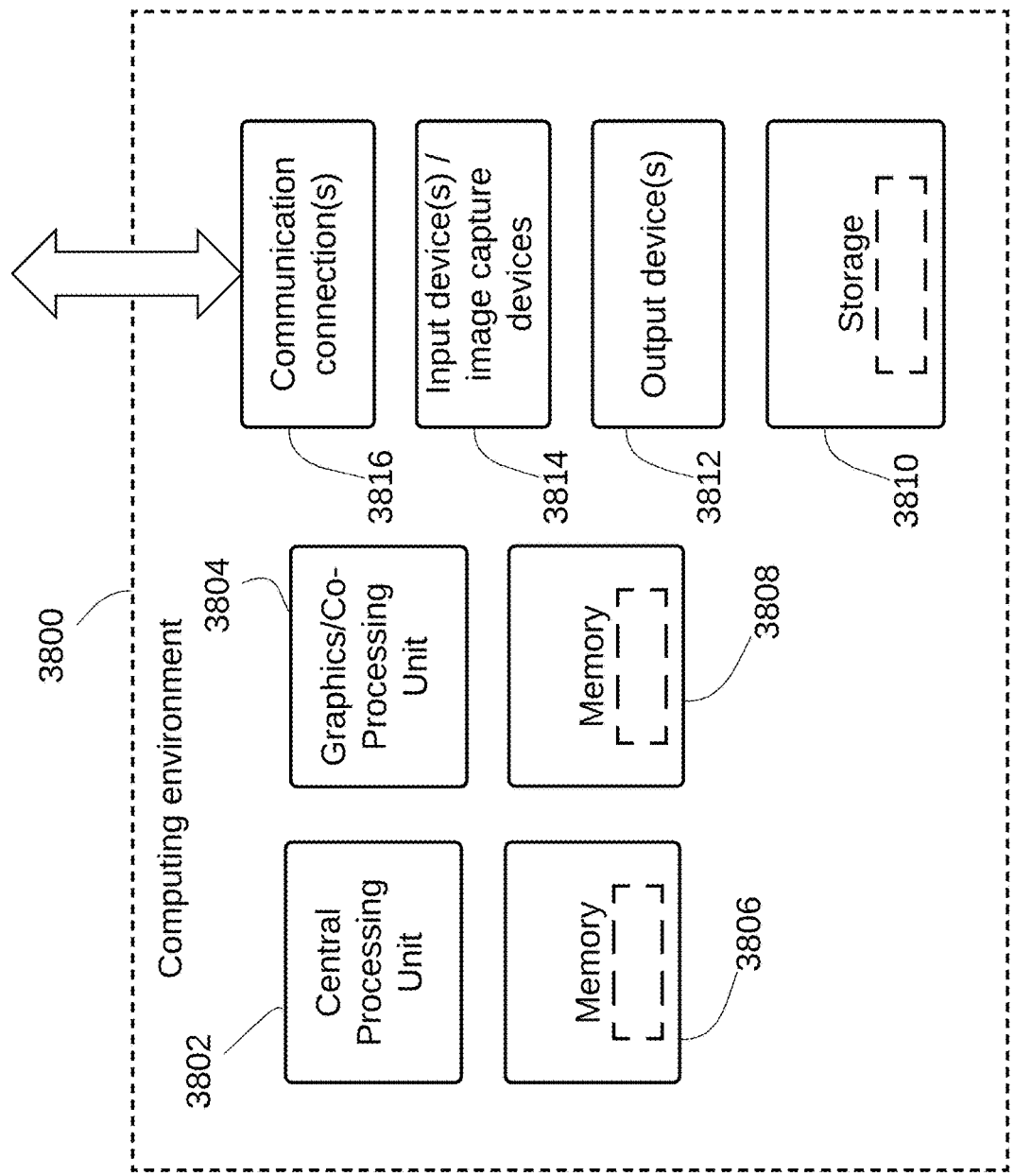
FIG. 38 illustrates a block diagram of hardware that may be employed in an implementation of the RPA systems disclosed herein.

FIG. 38 illustrates a block diagram of hardware that may be employed in an implementation of the RPA system as disclosed herein. FIG. 38 depicts a generalized example of a suitable general-purpose computing system 3800 in which the described innovations may be implemented in order to improve the processing speed and efficiency with which the computing system 3800 operates to perform the functions disclosed herein. With reference to FIG. 38 the computing system 3800 includes one or more processing units 3802, 3804 and memory 3806, 3808. The processing units 3802, 3806 execute computer-executable instructions. A processing unit can be a general-purpose central processing unit (CPU), processor in an application-specific integrated circuit (ASIC) or any other type of processor. The tangible memory 3806, 3808 may be volatile memory (e.g., registers, cache, RAM), non-volatile memory (e.g., ROM, EEPROM, flash memory, etc.), or some combination of the two, accessible by the processing unit(s). The hardware components in FIG. 38 may be standard hardware components, or alternatively, some embodiments may employ specialized hardware components to further increase the operating efficiency and speed with which the system 10 operates. The various components of computing system 3800 may be rearranged in various embodiments, and some embodiments may not require nor include all of the above components, while other embodiments may include additional components, such as specialized processors and additional memory.

Computing system 3800 may have additional features such as for example, storage 3810, one or more input devices 3814, one or more output devices 3812, and one or more communication connections 3816. An interconnection mechanism (not shown) such as a bus, controller, or network interconnects the components of the computing system 3800. Typically, operating system software (not shown) provides an operating system for other software executing in the computing system 3800, and coordinates activities of the components of the computing system 3800.

The tangible storage 3810 may be removable or non-removable, and includes magnetic disks, magnetic tapes or cassettes, CD-ROMs, DVDs, or any other medium which can be used to store information in a non-transitory way, and which can be accessed within the computing system 3800. The storage 3810 stores instructions for the software implementing one or more innovations described herein.

The input device(s) 3814 may be a touch input device such as a keyboard, mouse, pen, or trackball, a voice input device, a scanning device, or another device that provides input to the computing system 3800. For video encoding, the input device(s) 3814 may be a camera, video card, TV tuner card, or similar device that accepts video input in analog or digital form, or a CD-ROM or CD-RW that reads video samples into the computing system 3800. The output device(s) 3812 may be a display, printer, speaker, CD-writer, or another device that provides output from the computing system 3800.

The communication connection(s) 3816 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with the disclosed embodiments, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computer-implemented method for operating a robotic processing automation system, the computer-implemented method comprising:
   training a machine learning model with a portion of an initial dataset comprising a plurality of images to cause the machine learning model to detect user interface control objects in each of a plurality of object classes, wherein each image of the plurality of images represents a screen of information containing one or more user interface control objects, wherein each user interface control object of the one or more user interface control objects is part of a corresponding user interface object class;
   modifying the initial dataset by,
      processing, via the robotic processing automation system, screen images generated by a first application program to detect user interface control objects in the screen images generated by the first application program,
      creating, via the robotic processing automation system, a set of new application screen images as a function of the user interface control objects detected in the screen images generated by the first application program, and
      generating, via the robotic processing automation system, an updated dataset by modifying the initial dataset with the set of new application screen images; and
   further training the machine learning model with the updated dataset,
   wherein the processing the screen images generated by the first application program to detect user interface control objects in the screen images generated by the first application program further comprises:
      retrieving from the initial dataset a set of tagged screen images where each tagged screen image of the set of tagged screen images comprises a set of tagged bounding boxes, each tagged bounding box of the set of tagged bounding boxes surrounding a corresponding user interface control object, and a tagged object class identifier that classifies the corresponding user interface control object into one of the plurality of object classes;
      processing the set of tagged screen images with the machine learning model, as trained by the initial dataset, to generate for each tagged screen image of the set of tagged screen images, a set of detected bounding boxes each bounding box of the set of detected bounding boxes having associated therewith an object class label that identifies an object class associated with a user interface control object within an associated bounding box and a confidence score indicative of a level of confidence of identification of the user interface control object within the associated bounding box;
      comparing for each tagged screen image of the set of tagged screen images, the set of detected bounding boxes to the set of tagged bounding boxes to generate a set of failure cases comprising missed or incorrectly identified bounding boxes;
      collecting invariance parameters associated with each user interface control object contained in the set of failure cases; and
      generating a set of updated invariance parameters by updating invariance parameters employed by the machine learning engine as a function of the invariance parameters associated with each user interface control object contained in the set of failure cases, and wherein the creating of the set of new application screen images via the robotic processing automation system comprises generating, for each new application screen image of the set of new application screen images, one or more generated user interface control objects as a function of the updated invariance parameters, and incorporating the one or more generated user interface control objects into a new application screen image associated therewith.

2. A computer-implemented method, the computer-implemented method comprising:

training a machine learning model with a portion of an initial dataset comprising a plurality of images to cause the machine learning model to detect user interface control objects in each of a plurality of object classes, wherein each image of the plurality of images represents a screen of information containing one or more user interface control objects, wherein each user interface control object of the one or more user interface control objects is part of a corresponding user interface object class;

modifying the initial dataset by,
  processing screen images generated by a first application program to detect user interface control objects in the screen images generated by the first application program,
  creating a set of new application screen images as a function of the user interface control objects detected in the screen images generated by the first application program, and
  generating an updated dataset by modifying the initial dataset with the set of new application screen images; and
further training the machine learning model with the updated dataset,
wherein the processing the screen images generated by the first application program to detect user interface control objects in the screen images generated by the first application program comprises:
  capturing application screen images generated by the first application program as the first application program is used by a user of the first application program and capturing user inputs entered by the user;
  processing each captured application screen image of the captured application screen images with the machine learning model, as trained by the initial dataset, to detect user interface control objects in each captured screen image of the captured application screen images;
  validating for each captured application screen image of the captured application screen images, detected user interface control objects in each captured application screen image of the captured application screen images, as a function of user inputs entered into an application screen of the first application program that corresponds to each captured screen image of the captured application screen images;
  employing validated user interface control objects for a captured application screen image of the captured application screen images to extract object level characteristics for each user interface control object in the captured application screen image;
  computing for each user interface control object in the captured application screen image one or more first invariance parameters; and
  computing for each application screen image of the captured application screen images one or more second invariance parameters,
wherein the creating of the set of new application screen images comprises:
  generating, for each one or more new application screen images of the set of new application screen images, one or more generated user interface control objects as a function of the one or more first invariance parameters and/or the one or more second invariance parameters, and incorporating the one or more generated user interface control objects into a new application screen image associated therewith; and
  synthesizing the one or more new application screen images, each of the one or more new application screen images containing one or more further user interface control objects, from the one or more first invariance parameters and the one or more second invariance parameters, and incorporating the one or more synthesized new screen images into the set of new application screen images, and
wherein receiving from the user a designation of a bounding box surrounding an undetected or incorrectly detected user interface control object, and further receiving from the user an object class label corresponding to a user interface control object within the bounding box designated by the user.

3. The computer-implemented method of claim 2 wherein the processing each captured application screen image with the machine learning model, as trained by the initial dataset, to detect user interface control objects in each captured screen image, comprises:
  generating for each captured application screen image, a set of detected bounding boxes, each of the bounding boxes having associated therewith an object class label that identifies an object class associated with a user interface control object within the associated bounding box and a confidence score indicative of a level of confidence of identification of the user interface control object within the associated bounding box.

4. The computer-implemented method of claim 2 further comprising applying a privacy constraint to one or more of detected user interface control objects to remove information in the one or more of detected user interface control objects.

5. The computer-implemented method of claim 2 wherein synthesizing one or more new application screen images, each of which contain one or more user interface control objects, from the invariance parameters corresponding to the user interface control objects and to the application screen images comprises:
  for a selected one of the captured screen images, generating for a new application screen image a monochromatic background color as a function of a dominant background color in the selected one of the captured screen images; and
  generating for placement on the new application screen image user interface control objects at the same locations as user interface control objects in the selected one of the captured screen images and applying a background color to each generated user interface control object to cause textual input in the generated user interface control objects to be removed.

6. The computer-implemented method of claim 2 wherein synthesizing one or more new application screen images, each of which contain one or more user interface control objects, from the invariance parameters corresponding to the user interface control objects and to the application screen images comprises:
for a selected one of the captured screen images, generating a new application screen image by generating for each text string in the selected one of the captured screen images a random text string and placing each generated random text strings at a location occupied by a text string in the selected one of the captured screen images.

7. The computer-implemented method of claim 2 wherein synthesizing one or more new application screen images, each of which contain one or more user interface control objects, from the invariance parameters corresponding to the user interface control objects and to the application screen images comprises:
for a selected one of the captured screen images, generating a new application screen image by
selecting a subset of user interface control objects detected in the selected one of the captured screen images;
selecting a subset of text strings detected in the selected one of the captured screen images;
generating a uniform background color for the new application screen image; and
placing the selected subset of user interface control objects and the selected subset of text strings onto the new application screen image.

8. A computer system comprising:
data storage having stored thereupon an initial dataset comprising a plurality of images, wherein each image of the plurality of images represents a screen of information containing one or more user interface control objects, wherein each user interface control object of the one or more user interface control objects is part of a corresponding user interface object class; and
a processor, programmed with instructions that cause the processor to train a machine learning model by:
training the machine learning model with a portion of the initial dataset to cause the machine learning model to detect user interface control objects in each of a plurality of object classes;
modifying the initial dataset by,
processing screen images generated by a first application program to detect user interface control objects in the screen images generated by the first application program,
creating a set of new application screen images as a function of characteristics corresponding to the user interface control objects detected in the screen images generated by the first application program, and
generating an updated dataset by modifying the initial dataset with the set of new application screen images; and
further training the machine learning model with the updated dataset,
wherein processing the screen images generated by the first application program to detect user interface control objects in the screen images generated by the first application program comprises:
retrieving from the initial dataset a set of tagged screen images where each tagged screen image of the set of tagged screen images comprises a set of tagged bounding boxes, each tagged bounding box of the set of tagged bounding boxes surrounding a corresponding user interface control object, and a tagged object class identifier that classifies the corresponding user interface control object into one of the plurality of object classes;
processing the set of tagged screen images with the machine learning model, as trained by the initial dataset, to generate for each tagged screen image of the set of tagged screen images, a set of detected bounding boxes each bounding box of the set of detected bounding boxes having associated therewith an object class label that identifies an object class associated with a user interface control object within an associated bounding box and a confidence score indicative of a level of confidence of identification of the user interface control object within the associated bounding box;
comparing for each tagged screen image of the set of tagged screen images, the set of detected bounding boxes to the set of tagged bounding boxes to generate a set of failure cases comprising missed or incorrectly identified bounding boxes;
collecting invariance parameters associated with each user interface control object contained in the set of failure cases; and
generating a set of updated invariance parameters by updating invariance parameters employed by the machine learning engine as a function of the invariance parameters associated with each user interface control object contained in the set of failure cases, and
wherein the creating of the set of new application screen images comprises generating, for each new application screen image of the set of new application screen images, one or more user generated interface control objects as a function of the updated invariance parameters, and incorporating the one or more generated user interface control objects into a new application screen image associated therewith.

9. A computer system comprising:
data storage having stored thereupon an initial dataset comprising a plurality of images, wherein each image of the plurality of images represents a screen of information containing one or more user interface control objects, wherein each user interface control object of the one or more user interface control objects is part of a corresponding user interface object class; and
a processor, programmed with instructions that cause the processor to train a machine learning model by:
training the machine learning model with a portion of the initial dataset to cause the machine learning model to detect user interface control objects in each of a plurality of object classes;
modifying the initial dataset by,
processing screen images generated by a first application program to detect user interface control objects in the screen images generated by the first application program,
creating a set of new application screen images as a function of characteristics corresponding to the user interface control objects detected in the screen images generated by the first application program, and
generating an updated dataset by modifying the initial dataset with the set of new application screen images; and further training the machine learning model with the updated dataset, wherein the processing the screen images generated by the first application program to detect user interface control objects in the screen images generated by the first application program comprises:

capturing application screen images generated by the first application program as the first application program is used by a user of the first application program and capturing user inputs entered by the user;

processing each captured application screen image of the captured application screen images with the machine learning model, as trained by the initial dataset, to detect user interface control objects in each captured screen image of the captured application screen images;

validating, for each captured application screen image of the captured application screen images, detected user interface control objects in each captured application screen image of the captured application screen images, as a function of user inputs entered into an application screen of the first application program that corresponds to each captured screen image of the captured application screen images;

employing validated user interface control objects for a captured application screen image of the captured application screen images to extract object level characteristics for each user interface control object in the captured application screen image;

computing for each user interface control object in the captured application screen image one or more first invariance parameters; and computing for each application screen image of the captured application screen images one or more second invariance parameters, wherein the creating of the set of new application screen images comprises:

generating, for each one or more new application screen images of the set of new application screen images, one or more generated user interface control objects as a function of the one or more first invariance parameters and/or the one or more second invariance parameters, and incorporating the one or more generated user interface control objects into a new application screen image associated therewith; and synthesizing the one or more new application screen images, each of the one or more new application screen images containing one or more further user interface control objects, from the one or more first invariance parameters and the one or more second invariance parameters, and incorporating the one or more synthesized new screen images into the set of new application screen images, and wherein receiving from the user a designation of a bounding box surrounding an undetected or incorrectly detected user interface control object, and further receiving from the user an object class label corresponding to a user interface control object within the bounding box designated by the user.

10. A non-transitory storage medium, having stored thereupon one or more program modules comprising computer-executable instructions for execution on a computer system, the computer-executable instructions executing on a server processor to cause the computer system to perform a computer-implemented method, the computer-implemented method comprising:

training a machine learning model with a portion of an initial dataset comprising a plurality of images to cause the machine learning model to detect user interface control objects in each of a plurality of object classes, wherein each image of the plurality of images represents a screen of information containing one or more user interface control objects, wherein each user interface control object of the one or more user interface control objects is part of a corresponding user interface object class;

modifying the initial dataset by, processing screen images generated by a first application program to detect user interface control objects in the screen images generated by the first application program, creating a set of new application screen images as a function of the user interface control objects detected in the screen images generated by the first application program, and generating an updated dataset by modifying the initial dataset with the set of new application screen images; and further training the machine learning model with the updated dataset, wherein the processing the screen images generated by the first application program to detect user interface control objects in the screen images generated by the first application program comprises:

retrieving from the initial dataset a set of tagged screen images where each tagged screen image of the set of tagged screen images comprises a set of tagged bounding boxes, each tagged bounding box of the set of tagged bounding boxes surrounding a corresponding user interface control object, and a tagged object class identifier that classifies the corresponding user interface control object into one of the plurality of object classes;

processing the set of tagged screen images with the machine learning model, as trained by the initial dataset, to generate for each tagged screen image of the set of tagged screen images, a set of detected bounding boxes each bounding box of the set of detected bounding boxes having associated therewith an object class label that identifies an object class associated with a user interface control object within an associated bounding box and a confidence score indicative of a level of confidence of identification of the user interface control object within the associated bounding box;

comparing for each tagged screen image of the set of tagged screen images, the set of detected bounding boxes to the set of tagged bounding boxes to generate a set of failure cases comprising missed or incorrectly identified bounding boxes;

collecting invariance parameters associated with each user interface control object contained in the set of failure cases; and generating a set of updated invariance parameters by updating invariance parameters employed by the machine learning engine as a function of the invariance parameters associated with each user interface control object contained in the set of failure cases, and wherein the creating of the set of new application screen images comprises generating, for each new application screen image of the set of new application screen images, one or more generated user interface control objects as a function of the updated invariance parameters, and incorporating the one or more generated user interface control objects into a new application screen image associated therewith.

11. The non-transitory storage medium of claim 10 wherein the operation of processing the screen images generated by the first application program to detect user interface control objects in the screen images generated by the first application program comprises:
   capturing application screen images generated by the first application program as the first application program is used by a user of the first application program and capturing user inputs entered by the user;
   processing each captured application screen image with the machine learning model, as trained by the initial dataset, to detect user interface control objects in each captured screen image;
   validating for each captured screen image, detected user interface control objects in each captured screen image, as a function of user inputs entered into the application screen of the first application program that corresponds to each captured screen image;
   employing validated user interface control objects for a captured screen image to extract object level characteristics for each user interface control object in the application screen image;
   computing for each user interface control object in the application screen image one or more invariance parameters;
   computing for each application screen image one or more invariance parameters; and
   synthesizing one or more new application screen images, each of which contain one or more user interface control objects, from the invariance parameters corresponding to the user interface control objects and to the application screen images.

12. The non-transitory storage medium of claim 10 wherein the invariance characteristics corresponding to the user interface control objects comprise one or more of height, width, aspect ratio, color and text.

13. The computer-implemented method of claim 1 wherein the invariance parameters associated with each user interface control object comprise one or more of height, width, aspect ratio, color and text associated with a user interface control object.

14. The computer-implemented method of claim 2 wherein the one or more first invariance parameters and/or the one or more second invariance parameters comprise arrangement of user interface control objects in a corresponding screen image, and resolution and noise in the corresponding screen image.

15. The computer system of claim 8 wherein the invariance parameters corresponding to the user interface control objects comprise one or more of height, width, aspect ratio, color and text.

\* \* \* \* \*